United States Patent
Nakano

(10) Patent No.: US 9,392,603 B2
(45) Date of Patent: Jul. 12, 2016

(54) RADIO COMMUNICATION SYSTEM, RADIO COMMUNICATION APPARATUS, AND RADIO COMMUNICATION METHOD FOR RADIO COMMUNICATION SYSTEM

(71) Applicant: FUJITSU LIMITED, Kawasaki-shi, Kanagawa (JP)

(72) Inventor: Hiroyuki Nakano, Fukaya (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/643,509

(22) Filed: Mar. 10, 2015

(65) Prior Publication Data

US 2015/0189654 A1 Jul. 2, 2015

Related U.S. Application Data

(63) Continuation of application No. PCT/JP2012/073887, filed on Sep. 19, 2012.

(51) Int. Cl.
  *H04W 72/04* (2009.01)
  *H04W 16/14* (2009.01)

(52) U.S. Cl.
  CPC .......... *H04W 72/0453* (2013.01); *H04W 16/14* (2013.01)

(58) Field of Classification Search
  CPC .................................................. H04W 72/0453
  See application file for complete search history.

(56) References Cited

U.S. PATENT DOCUMENTS

2012/0095626 A1* 4/2012 Smith .............................. 701/19

FOREIGN PATENT DOCUMENTS

| JP | 2005-165731 A | 6/2005 |
|---|---|---|
| JP | 2007-67771 A | 3/2007 |
| JP | 2009-5006 A | 1/2009 |
| JP | 2009-74881 A | 4/2009 |
| JP | 2011-2445 A | 1/2011 |
| JP | 2011-77623 A | 4/2011 |
| JP | 2012-48489 A | 3/2012 |

OTHER PUBLICATIONS

Kei Inage et al "White Space Vectors for channel selection in vehicular cognitive networks" IEEE VNC 2011 (Vehicular Networking Conference), Nov. 14-16, 2011.*

(Continued)

*Primary Examiner* — Leon Flores
(74) *Attorney, Agent, or Firm* — Arent Fox LLP

(57) ABSTRACT

A radio communication system includes: a storage apparatus which stores frequency information relating to a frequency band being usable for radio communication; a first radio communication apparatus which acquires the frequency information from the storage apparatus; and a second radio communication apparatus which performs radio communication with the first radio communication apparatus, wherein the first radio communication apparatus includes a transmission unit which transmits to the second radio communication apparatus the frequency information acquired from the storage apparatus and relating to a frequency band being usable for radio communication in a region to which the first radio communication apparatus moves, and the second radio communication apparatus includes a receiving unit which receives the frequency information from the first radio communication apparatus.

13 Claims, 17 Drawing Sheets

(56) References Cited

OTHER PUBLICATIONS

Ferderal Communications Commision, "Second Memorandum Opinion and Order (FCC 10-174)", In the Matter of Unlicensed Operation in the TV Broadcast Bands (ET Docket No. 04-186) and Additional Spectrum for Unlicensed Devices Below 900 MHz and in the 3 GHz Band (ET Docket No. 02-380) Released Sep. 23, 2010 101 pp.

Federal Communications Commission, "Second Report and Order and Memorandum Opinion and Order (FCC 08-260)", In the Matter of Unlicensed Operation in the TV Broadcast Bands (ET Docket No. 04-186) and Additional Spectrum for Unlicensed Devices Below 900 MHz and in the 3 GHz Band (ET Docket No. 02-380) Released: Nov. 14, 2008 130 pp.

International Search Report mailed Oct. 23, 2012, in corresponding International Patent Application No. PCT/JP2012/073887.

* cited by examiner

RADIO COMMUNICATION SYSTEM, RADIO COMMUNICATION APPARATUS, AND RADIO COMMUNICATION METHOD FOR RADIO COMMUNICATION SYSTEM

CROSS-REFERENCE TO RELATED APPLICATION

This application is a continuation application of International Application PCT/JP2012/073887 filed on Sep. 19, 2012 and designated the U.S., the entire contents of which are incorporated herein by reference.

FIELD

The embodiments discussed herein are related to a radio communication system, a radio communication apparatus, and a radio communication method for the radio communication system.

BACKGROUND

Presently, terrestrial digital television broadcast (which may hereafter be referred to as "terrestrial digital broadcast") started also in Japan, and with this, a frequency band for use for the terrestrial digital broadcast is reconfigured. For example, a frequency band as large as 300 MHz that ranges from 470 MHz to 770 MHz is allocated and currently in use for the terrestrial digital broadcast in Japan.

However, there may be cases that the frequency band (or frequency bandwidth) allocated to the terrestrial digital broadcast is not used dependent on a time zone and a region. For example, some broadcast stations do not provide terrestrial digital broadcast late at night, early in the morning, etc. Also, there are cases that a frequency band (for example, a channel number "X") allocated to terrestrial digital broadcast in one region (for example, Tokyo etc.) is not used as a frequency band for terrestrial digital broadcast in another region (for example, Osaka etc.).

Accordingly, a use of performing radio communication using a white space is presently taken into consideration. The white space signifies a frequency band (or frequency bandwidth) that is unused despite that a use license for a specific frequency band is granted for the purpose of a specific radio wave use service. For example, as described above, there is a frequency band that is not used dependent on a time zone and a region, and the use of such a frequency band by a secondary user to which the license is not granted is considered.

A frequency band available as a white space is, for example, a frequency of 1 GHz or lower, the use of which has various advantages including a flexible propagation characteristic, easy long-distance communication, etc. in comparison with a frequency band higher than 1 GHz.

In regard to such a white space, for example, radio communication using a database is currently under study in the U.S. FCC (Federal Communications Commission).

For example, information related to an available radio frequency and an available region is retained in the database, and a radio communication apparatus accesses the database as a secondary user to acquire the information of the available frequency band. Using the acquired frequency band, the radio communication apparatus performs radio communication in the region of concern. This enables prevention of radio communication interference between secondary users in the frequency band of the white space.

Meanwhile, as such a kind of technique, the following is disclosed, for example.

Namely, there is a technique in which a user sets a destination to a terminal apparatus, and when the user selects a content desired to view during traveling, the terminal apparatus searches for a shortest route that produces a poor reception state of the content. In the case of the above technique, the terminal apparatus preserves a broadcast reception level, information of a road section that produces a poor reception state of the content and reception channel information, as preservation information, so that can share the preservation information among terminal apparatuses or download the above preservation information from a server and a mobile terminal.

Further, there is a technique in which a mobile information terminal accesses a center server system to acquire local information instructed by an operator, so as to store the genre of the local information and effective range information indicative of a search region range. In this case, for example, when the search of local information is instructed by the operator in another opportunity, the mobile information terminal is configured to prevent duplicated downloading of the same local information by use of the stored effective range information.

CITATION LIST

Non-Patent Literature

[Non-patent literature 1] FCC Second Report and Order and Memorandum Opinion and Order—FCC 08-260
[Non-patent literature 2] FCC Second Memorandum Opinion and Order—FCC 10-174

Patent Literature

[Patent literature 1] Japanese Laid-open Patent Publication No. 2009-74881
[Patent literature 2] Japanese Laid-open Patent Publication No. 2005-165731.

However, in regard to the technique for accessing the database, there is a case when the database is accessed at every movement of a predetermined distance (for example, 50 m), depending on the type of a radio communication apparatus.

For example, when the radio communication apparatus moves at a constant speed or greater, an access frequency from the radio communication apparatus to the database comes to a constant or greater, and with this, an amount of communication traffic comes to a constant or greater.

In such a case, if the amount of communication traffic exceeds a tolerance, there may be cases that the exchange of data etc. becomes disabled between a base station and the radio communication apparatus. This may cause congestion in the overall operation of the radio communication system in some cases.

Meanwhile, in the technique of searching for a shortest route that produces a poor broadcast reception state of the content or the technique for preventing the duplicated downloading of the same local information, no consideration is given on a database for storing information related to a white space. Therefore, there may be a case when an access frequency of accesses to the database comes to a constant or greater, and with this, an amount of communication traffic comes to a constant or greater. Such a case may also cause congestion in the overall operation of the radio communication system.

SUMMARY

According to an aspect of the invention, a radio communication system includes: a storage apparatus which stores frequency information relating to a frequency band being usable for radio communication; a first radio communication apparatus which acquires the frequency information from the storage apparatus; and a second radio communication apparatus which performs radio communication with the first radio communication apparatus, wherein the first radio communication apparatus includes a transmission unit which transmits to the second radio communication apparatus the frequency information acquired from the storage apparatus and relating to a frequency band being usable for radio communication in a region to which the first radio communication apparatus moves, and the second radio communication apparatus includes a receiving unit which receives the frequency information from the first radio communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereafter, the present embodiments will be described in detail by reference to the drawings.

First Embodiment

Figure 1:
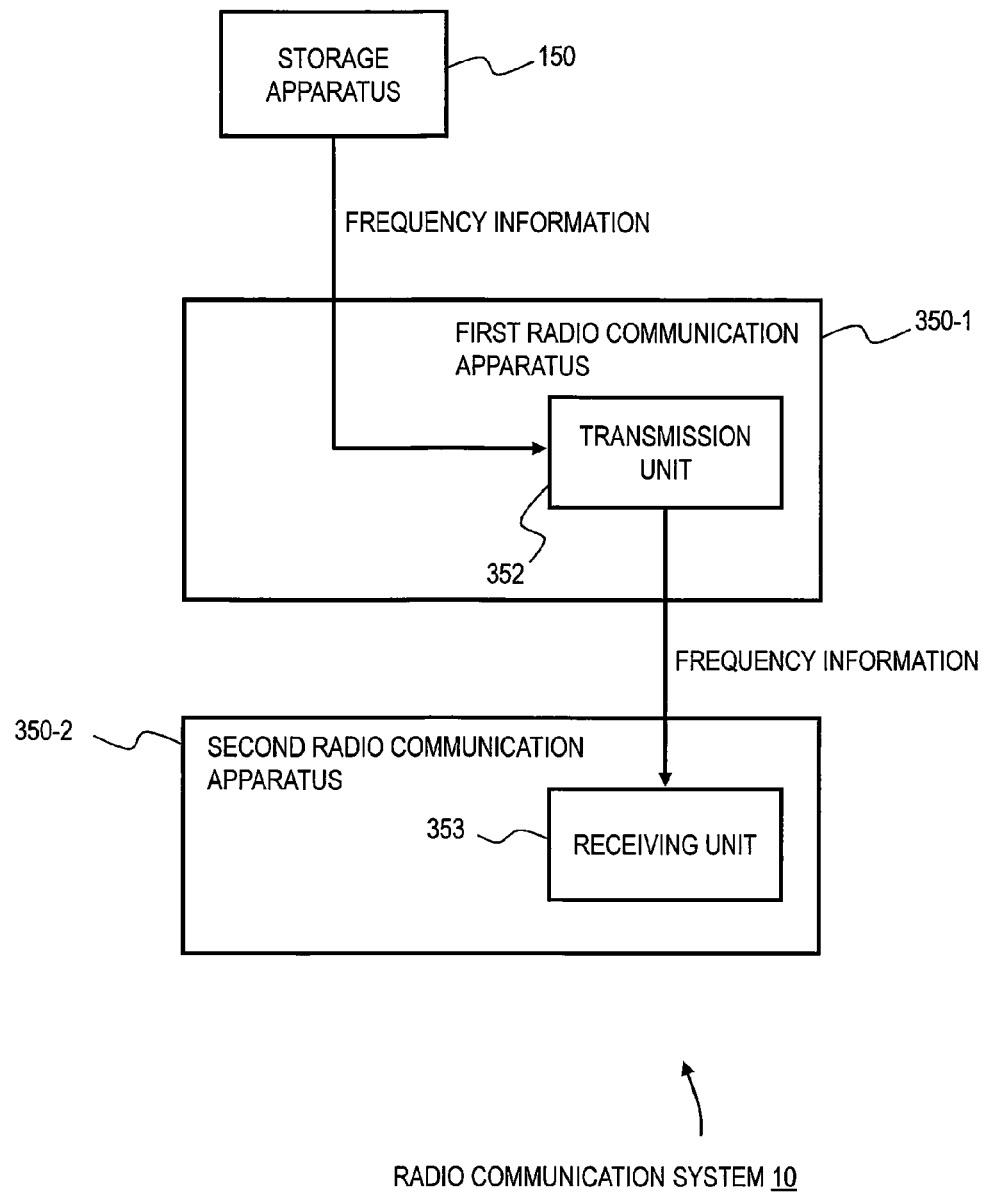
FIG. 1 is a diagram illustrating a configuration example of a radio communication system.

FIG. 1 is a diagram illustrating a configuration example of a radio communication system 10 according to a first embodiment. The radio communication system 10 includes a storage apparatus 150, and a first and a second radio communication apparatus 350-1, 350-2.

The storage apparatus 150 stores frequency information related to a frequency band being usable for radio communication. The storage apparatus 150 is, for example, a database or the like. As the frequency information, for example, there is included information related to a frequency band that is not in use among frequency bands, allocated to terrestrial digital broadcast, and can be used when the first and second radio communication apparatuses 350-1, 350-2 perform radio communication.

The first radio communication apparatus 350-1 is a movable radio communication system, and can perform radio communication with the second radio communication apparatus 350-2 and another radio communication apparatus. The first radio communication apparatus 350-1 can also acquire frequency information from the storage apparatus. The first radio communication apparatus 350-1 includes a transmitter unit 352.

The transmitter unit 352 transmits to the second radio communication apparatus 350-2 frequency information that is acquired from the storage apparatus 150 and related to a frequency band that can be used for radio communication in a region to which the first radio communication apparatus 350-1 moves.

The first radio communication apparatus 350-1 can perform radio communication with the second radio communication apparatus 350-2 and the other radio communication apparatus, using the frequency information transmitted to the second radio communication apparatus 350-2.

The second radio communication apparatus 350-2 is also a movable radio communication apparatus, and can perform radio communication with the first radio communication apparatus 350-1 and another radio communication apparatus. The second radio communication apparatus 350-2 includes a receiving unit 353.

The receiving unit 353 receives frequency information from the first radio communication apparatus 350-1.

The second radio communication apparatus 350-2 can also perform radio communication with the first radio communication apparatus 350-1 and the other radio communication apparatus, using the frequency information received from the first radio communication apparatus 350-1.

The first radio communication apparatus 350-1 performs radio communication using the frequency information, in the case of which the frequency information comes to frequency information that can be used in the region to which the first radio communication apparatus 350-1 moves. Accordingly, the first radio communication apparatus 350-1 can use the frequency information of concern in the region of concern. Also, the second radio communication apparatus 350-2 can perform radio communication in the region of concern, using the frequency information of concern.

As such, the second radio communication apparatus 350-2 according to the first embodiment is configured to receive the frequency information from the first radio communication apparatus 350-1, without an access to the storage apparatus 150 in order to acquire the frequency information.

Accordingly, in the radio communication system according to the first embodiment, in comparison with a case when both of the two radio communication apparatuses 350-1, 350-2 communicate with the storage apparatus 150, it is possible to reduce an amount of communication traffic between the two radio communication apparatuses 350-1, 350-2 and the storage apparatus 150.

Second Embodiment

Next, a second embodiment will be described.
<Configuration Example of Radio Communication System>
First, a configuration example of a radio communication system according to the second embodiment will be described.

Figure 2:
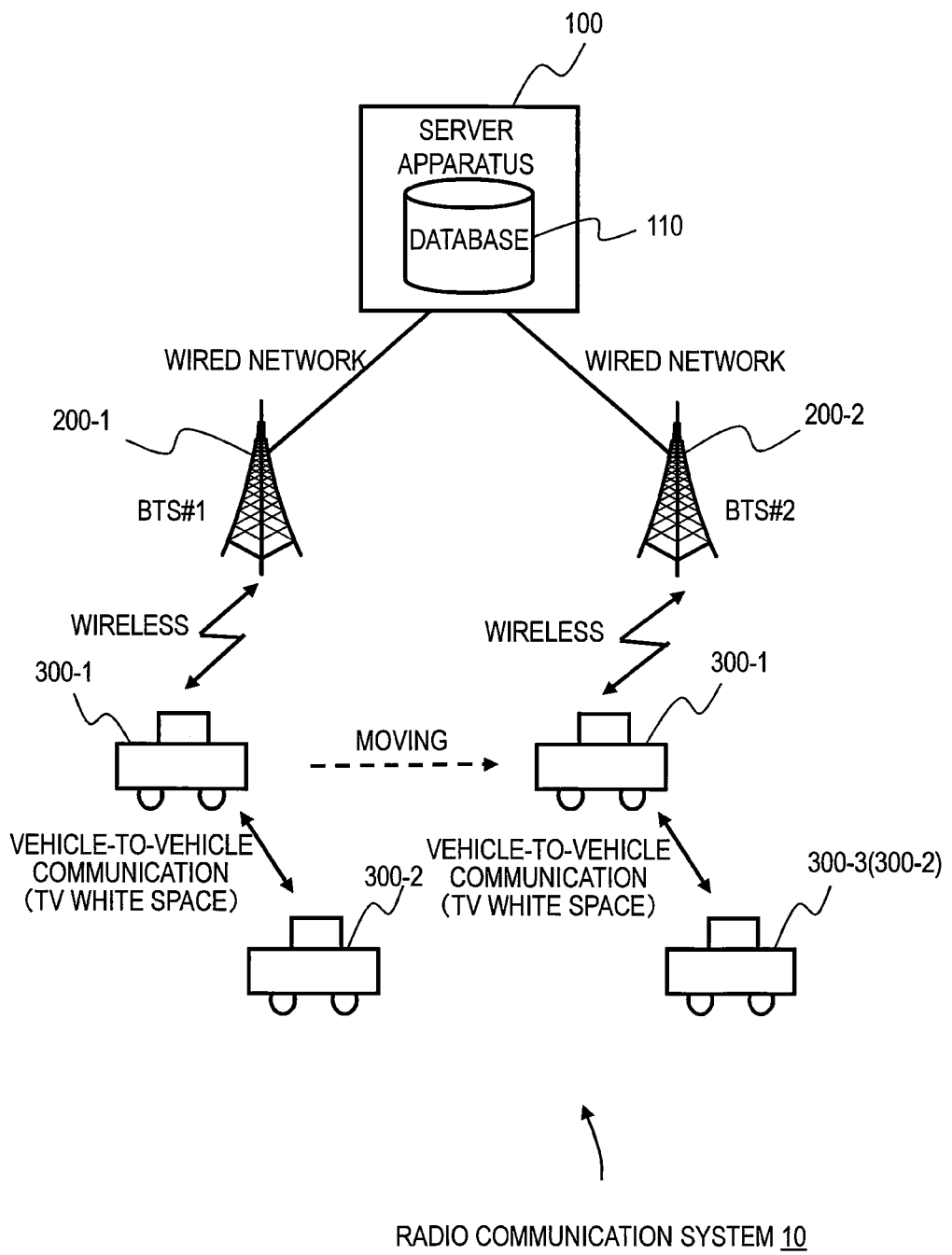
FIG. 2 is a diagram illustrating a configuration example of a radio communication system.

FIG. 2 is a configuration example of a radio communication system 10 according to the second embodiment. The radio communication system 10 includes a server apparatus 100, radio base station apparatuses (BTS: Base Transceiver Stations, which may hereafter be referred to as "base stations") (BTS#1, BTS#2) 200-1, 200-2 and radio communication apparatuses 300-1 to 300-3.

Here, each radio communication apparatus 300-1 to 300-3 is provided in each vehicle, for example, and can perform so-called vehicle-to-vehicle communication by radio communication among the radio communication apparatuses 300-1 to 300-3.

The server apparatus 100 includes a database 110. The database 110 retains information related to a white space on the basis of each region, district, or location (which may hereafter be referred to as "region"). The information related to the white space is information related to a frequency region that is not in use, despite that a use license for a specific frequency band is granted for the purpose of a specific radio wave use service. In the present second embodiment, the information related to the white space is information related to a frequency region not in use, among frequency bands allocated to terrestrial digital broadcast, and representing a frequency range that can be used by the radio communication apparatuses 300-1 to 300-3, for example. Hereafter, the information related to the white space may be referred to as idle channel information, for example.

The server apparatus 100, on receiving location information transmitted from the radio communication apparatuses 300-1 to 300-3, reads out idle channel information corresponding to the location information from the database 110. The server apparatus 100 then transmits the idle channel information to the radio communication apparatuses 300-1 to 300-3 through the base stations 200-1, 200-2. The details of the server apparatus 100 will be described later.

The base stations 200-1, 200-2 are connected to the server apparatus 100 by a wired network, and exchange data etc. with the server apparatus 100. Further, the base stations 200-1, 200-2 perform radio communication with the radio communication apparatuses 300-1 to 300-3 in each radio communicable range of each self-station. The base stations 200-1, 200-2 act a role to interface between a wired channel and a radio channel, for example. The details of the base stations 200-1, 200-2 will be described later.

Here, although an example of two base stations 200-1, 200-2 is illustrated in the example in FIG. 2, the number of existent base stations may be one, three or more.

The radio communication apparatuses 300-1 to 300-3 are movable radio communication apparatuses. Although attached to each vehicle in the example depicted in FIG. 2, each radio communication apparatus 300-1 to 300-3 may also be a feature phone, a smartphone, a portable personal computer, etc., for example.

The radio communication apparatus 300-1 to 300-3 performs radio communication with each base station 200-1, 200-2 in a radio communicable range of the base station 200-1, 200-2, and further can perform radio communication with another radio communication apparatus 300-1 to 300-3 in the radio communicable range. In the example in FIG. 2, the radio communication apparatus 300-1 performs radio communication with the base station 200-1, and also performs radio communication with the radio communication apparatus 300-2. Further, the radio communication apparatus 300-1, after moving, performs radio communication with the base station 200-2 and also performs radio communication with the radio communication apparatus 300-2 (or 300-3).

Also, each radio communication apparatuses 300-1 to 300-3 measures the location of each self-apparatus, to transmit to the base stations 200-1, 200-2 and another radio communication apparatus, as location information. For this purpose, the radio communication apparatus 300-1 to 300-3 retains software or hardware to execute GPS (Global Positioning System), for example.

In the present second embodiment, the radio communication apparatus 300-1 may be referred to as a master apparatus in some cases. The master apparatus 300-1 signifies, for example, a radio communication apparatus which downloads from the database 110 the idle channel information of all regions on a moving route in a certain period, and retains the downloaded idle channel information.

For example, when a moving range in one day is expected, the master apparatus 300-1 downloads from the database 110 idle channel information in the moving range. By the setting of a destination to a car navigation system in the master apparatus 300-1, for example, such a moving range can be expected from a moving route searched for to the destination. The details will be described later.

Additionally, in the present second embodiment, the master apparatus 300-1 functions as a movable database, for example.

Meanwhile, in the present second embodiment, each radio communication apparatus 300-2, 300-3 may be referred to as a slave apparatus in some cases, for example. Each slave apparatus 300-2, 300-3 signifies a radio communication apparatus which does not download idle channel information from the database 110, and instead, successively receives (or copies) idle channel information from the master apparatus 300-1, to retain in the memory etc. of each self-apparatus.

In this case, the slave apparatus 300-2, 300-3 can transmit the idle channel information received from the master apparatus 300-1 to another slave apparatus, and can also receive idle channel information from another slave apparatus.

For example, the slave apparatus 300-2, 300-3 can receive from the master apparatus 300-1 idle channel information related to an overlapped region between a region in which the master apparatus 300-1 moves and a region in which the slave apparatus 300-2, 300-3 moves. The details will be described later. The master apparatus 300-1 and the slave apparatus 300-2, 300-3 can perform vehicle-to-vehicle communication using the received idle channel information.

<Configuration Example of Each Apparatus>
Next, a description will be given on each configuration example of the server apparatus 100, the base stations 200-1, 200-2, the master apparatus 300-1 and the slave apparatuses 300-2, 300-3.

Here, in regard to the two base stations 200-1, 200-2, the configurations thereof are the same, for example, so that the description will be given as base station 200, unless otherwise noted. Also, in regard to the two slave apparatuses 300-2, 300-3, the configurations thereof are the same, so that the description will be given as slave apparatus 300-2, unless otherwise noted.

Figure 3:
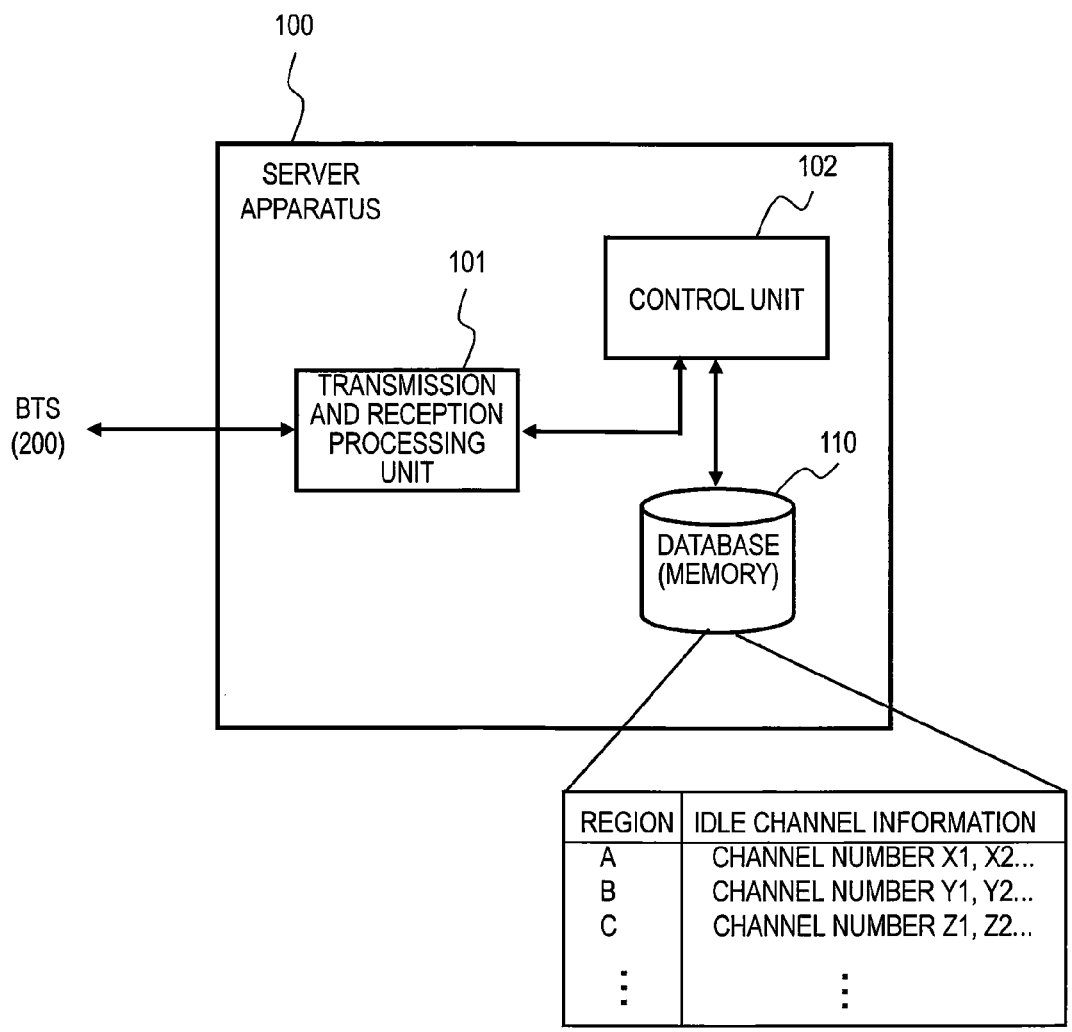
FIG. 3 is a diagram illustrating a configuration example of a server apparatus.

FIG. 3 is a diagram illustrating a configuration example of the server apparatus 100. The server apparatus 100 includes a transmission/reception processing unit 101, a control unit 102 and a database 110.

Here, the server apparatus 100 or the database 110 corresponds to the storage apparatus 150 in the first embodiment, for example.

The transmission/reception processing unit 101 receives data transmitted from the base station 200 to convert into a format processable in the server apparatus 100, and outputs the converted data to the control unit 102. The data transmitted from the base station 200 includes location information transmitted from the master apparatus 300-1, the identification information of the master apparatus 300-1, etc. Also, the transmission/reception processing unit 101 receives idle channel information, which is read out from the database 110 by the control unit 102, to convert into a format transmittable to the base station 200 and transmit to the base station 200.

On receiving the identification information of the master apparatus 300-1 from the transmission/reception processing unit 101, the control unit 102 discriminates from the identification information of the master apparatus 300-1 whether or not the master apparatus 300-1 of concern is an apparatus permitted to access the database 110.

For example, the identification information of an apparatus permitted to access the database 110 is retained in the memory of the server apparatus 100, and the control unit 102 confirms whether or not the identification information of the master apparatus 300-1 is already registered in the memory. This enables the control unit 102 to discriminate whether or not the master apparatus 300-1 is an apparatus permitted to access the database 110.

Then, on discriminating that the master apparatus 300-1 is an apparatus permitted to access the database 110, the control unit 102 reads out idle channel information from the database 110 on the basis of the information of the master apparatus 300-1, to output to the location transmission/reception processing unit 101.

In this case, as location information to be received by the server apparatus 100, not only the present location information of the master apparatus 300-1 but also location information related to a region included in a planned travel range of the master apparatus 300-1 can be received, for example.

Figure 7:
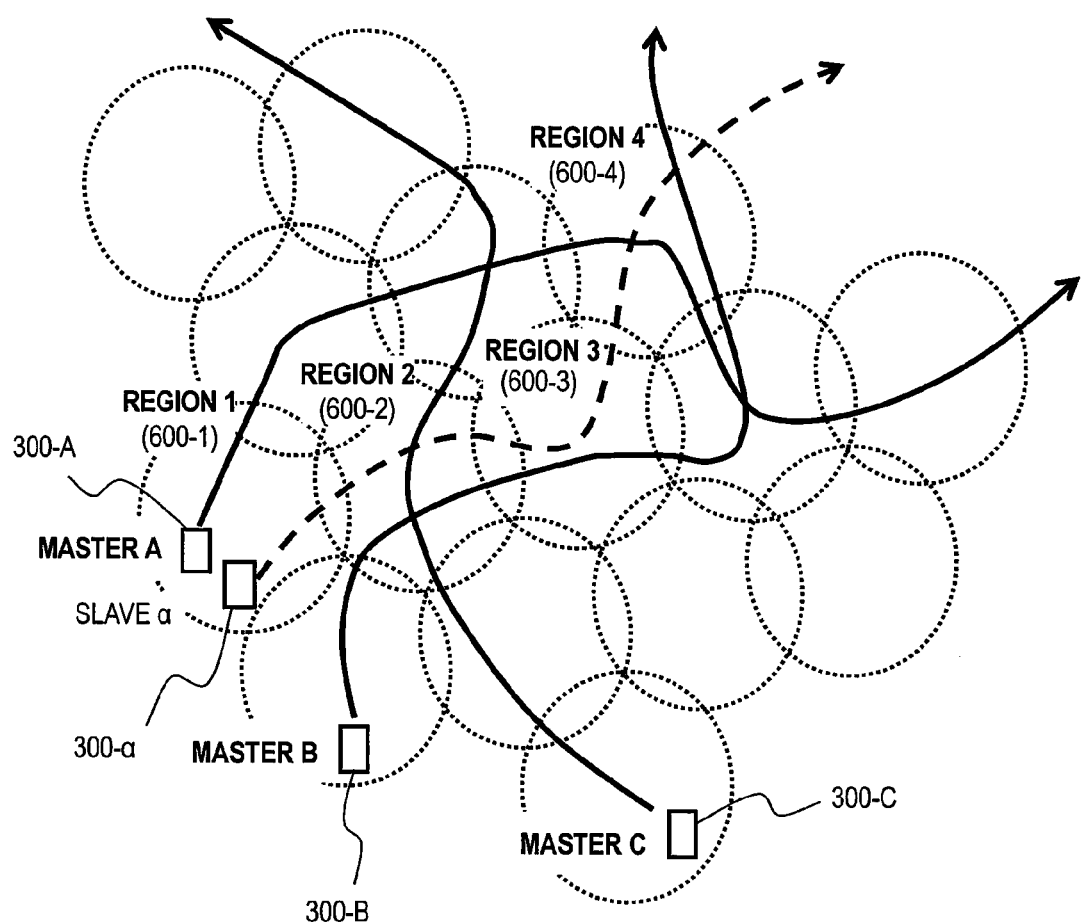
FIG. 7 is a diagram illustrating an example of each moving route of a master apparatus and a slave apparatus.

For example, as will be described later in detail, consider a case when a master apparatus 300-A is expected to move to a region 1 (600-1) and a region 4 (600-4), as depicted in FIG. 7, for example. In this case, as location information related to the region included in the planned travel range, the server apparatus 100 can receive the location information of the region 1 (600-1) and the region 4 (600-4). In this case, the server apparatus 100 reads out the idle channel information of the region 1 (600-1) and the region 4 (600-4) from the database 110, to transmit to the master apparatus 300-A.

Referring back to FIG. 3, the control unit 102 outputs the idle channel information read out from the database 110 to the transmission/reception processing unit 101. In this case, in order to represent that the idle channel information is idle channel information for the master apparatus 300-1, for example, the control unit 102 adds the identification information of the master apparatus 300-1 to the idle channel information, to output to the transmission/reception processing unit 101. Also, for example, the control unit 102 outputs information related to the region read out from the database 110, together with the idle channel information, to the transmission/reception processing unit 101.

In the database 110, there are retained information related to each region and idle channel information corresponding to the region, for example. Such the information related to the region and the idle channel information are stored in the database 110 by an administrator etc. operating the server apparatus 100. The database 110 is stored in, for example, the memory of the server apparatus 100, and in the following, a description will be given without distinction between the memory and the database 110 in particular.

In the example of the database 110 depicted in FIG. 3, each channel number is represented as idle channel information. The channel number is, for example, a number to identify a certain frequency band (or frequency bandwidth), including a channel number X1 which represents a frequency band from 470 MHz to 475 MHz, a channel number X2 which represents a frequency band from 475 MHz to 479 MHz, and so on. As the idle channel information, the database 110 can retain such channel numbers, for example. Otherwise, as idle channel information, it may also be possible to store an available frequency band itself, such as "from 470 MHz to 475 MHz" in a certain region, or the like.

Figure 4:
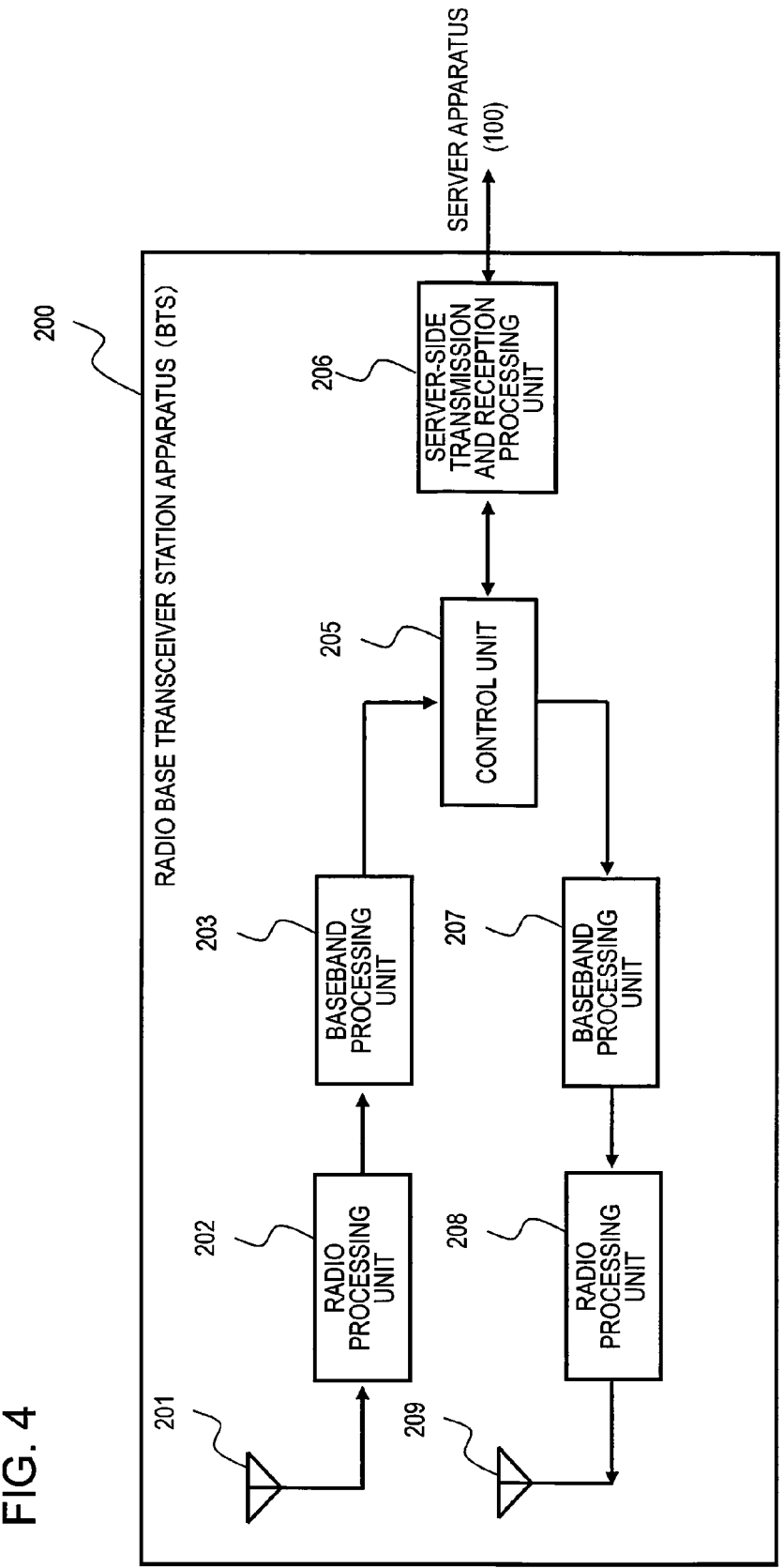
FIG. 4 is a diagram illustrating a configuration example of a radio base station apparatus.

Next, a description will be given on a configuration example of the base station 200. FIG. 4 is a diagram illustrating a configuration example of the base station 200.

The base station 200 includes a reception antenna 201, radio processing units 202, 208, baseband processing units 203, 207, a control unit 205, a server-side transmission/reception processing unit 206, and a transmission antenna 209.

The reception antenna 201 receives a radio signal transmitted from the master apparatus 300-1, to output to the radio processing unit 202 as a reception signal.

The radio processing unit 202 converts the reception signal of a radio frequency band into a baseband reception signal to output to the baseband processing unit 203. To enable such frequency conversion, the radio processing unit 202 may include a frequency conversion circuit, a BPF (Band Pass Filter), etc.

The baseband processing unit 203 performs demodulation processing, error correction decoding processing, etc. on the baseband reception signal, so as to extract data, a control signal, etc. To enable the demodulation processing, the error correction decoding processing, etc., the baseband processing unit 203 may internally include a demodulator circuit and an error correction decoding circuit, etc.

The control unit 205, on receiving data and a control signal from the baseband processing unit 203, extracts the identification information and the location information of the master apparatus 300-1, to output to the server-side transmission/reception processing unit 206.

Also, on receiving information related to a region, idle channel information, the identification information of the master apparatus 300-1, etc. from the server-side transmission/reception processing unit 206, the control unit 205 outputs the above information to the baseband processing unit 207.

The server-side transmission/reception processing unit 206, on receiving from the control unit 205 the identification information and the location information of the master apparatus 300-1, converts the above information into a format transmittable to the server apparatus 100, to transmit to the server apparatus 100. Also, on receiving from the server apparatus 100 the information related to the region, the idle channel information, the identification information of the master apparatus 300-1, etc., the server-side transmission/reception processing unit 206 converts the above information into a format processable in the base station 200, to output to the control unit 205.

The baseband processing unit 207 performs error correction coding processing, modulation processing, etc. on the information received from the control unit 205. To enable such error correction coding processing, modulation processing, etc., the baseband processing unit 207 may internally include an error correction coding circuit and a modulator circuit.

The radio processing unit 208 performs frequency conversion etc. on the output signal of the baseband processing unit 207, to output to the transmission antenna 209 as a radio signal of a radio frequency band. To enable such frequency conversion, the radio processing unit 208 may internally include a frequency conversion circuit, a BPF, etc.

The transmission antenna 209 transmits to the master apparatus 300-1 the radio signal output from the radio processing unit 208.

Figure 5:
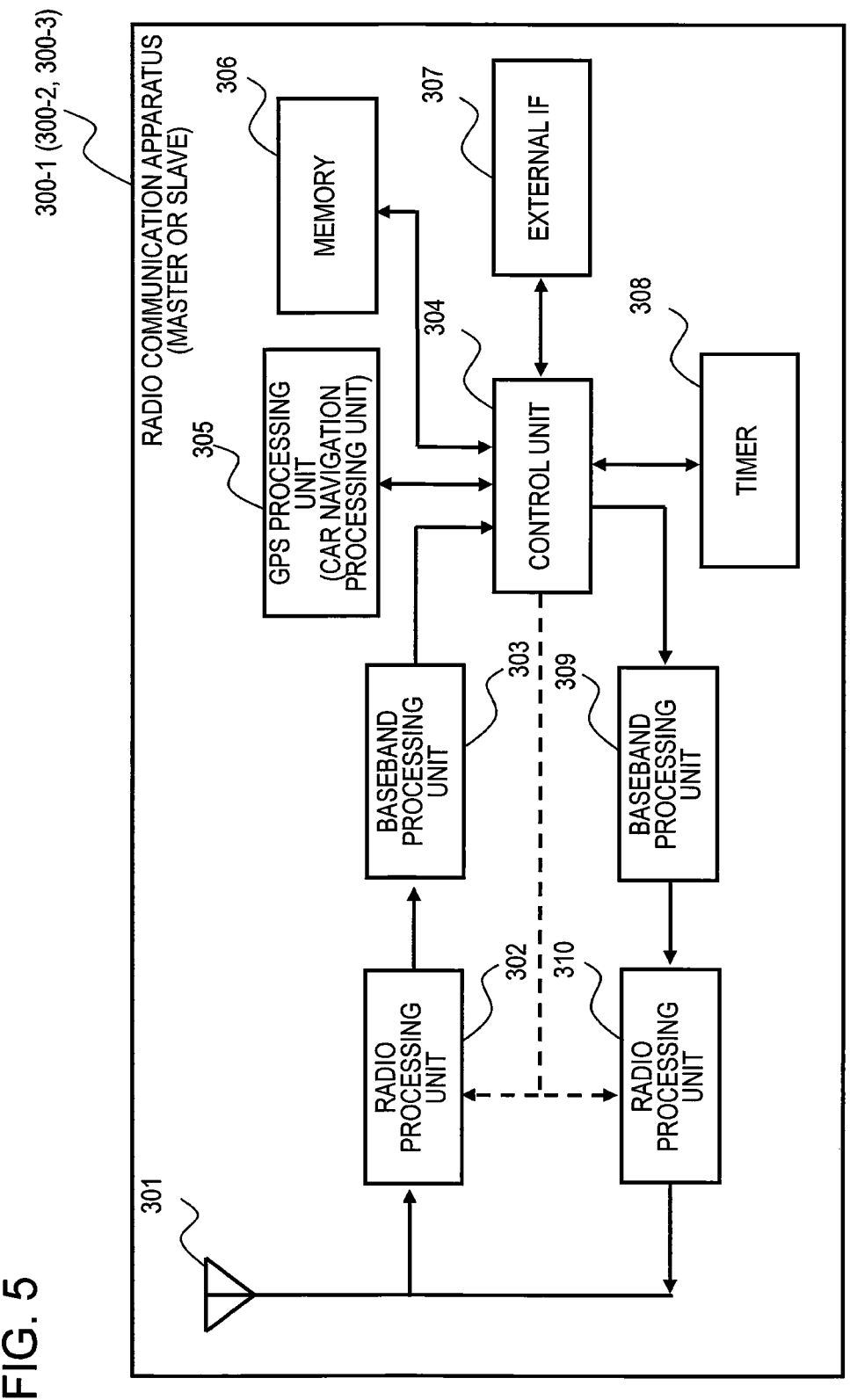
FIG. 5 is a diagram illustrating a configuration example of a radio communication apparatus.

Next, a description will be given on a configuration example of the master apparatus 300-1. FIG. 5 illustrates a configuration example of the master apparatus 300-1.

The master apparatus 300-1 includes an antenna 301, radio processing units 302, 310, baseband processing units 303, 309, a control unit 304, a GPS processing unit 305, a memory 306, an external IF (interface) 307 and a timer 308.

Here, the control unit 304, the baseband processing unit 309, the radio processing unit 310 and the antenna 301 correspond to the transmitter unit 352 in the first embodiment.

The antenna 301 receives a radio signal transmitted from the base station 200, to output to the radio processing unit 302 as a reception signal.

The radio processing unit 302 converts the reception signal from a radio frequency band to a base band, to output to the baseband processing unit 303. To enable such frequency conversion, the radio processing unit 302 may internally include a frequency conversion circuit and a BPF.

The baseband processing unit 303 performs demodulation processing, error correction decoding processing, etc. on the baseband reception signal. To enable such demodulation processing, error correction decoding processing, etc., the baseband processing unit 303 may internally include a demodulator circuit, an error correction decoding circuit, etc.

The control unit 304 extracts the identification information of the master apparatus 300-1 among each output from the baseband processing unit 303, and further, when the identification information is identification information that represents the self-apparatus, extracts information related to the region and the idle channel information from the output of the baseband processing unit 303. The control unit 304 stores the above information into the memory 306. Here, when the received identification information is not identification information that represents the self-apparatus, the control unit 304 may discard the received data.

Also, the control unit 304 supplies to the GPS processing unit 305 an instruction to measure the present location of the self-apparatus, so as to receive from the GPS processing unit 305 the location information that represents the present location of the self-apparatus. Further, the control unit 304 supplies an instruction to the GPS processing unit 305 to search for a route to a destination, for example, and receives the route information to the destination from the GPS processing unit 305. In this case, for the received route information to the destination, the control unit 304 can acquire location information related to a region included in the planned travel range (or location information representing a region through which the self-apparatus passes).

Such acquisition of the location information related to the region can be performed in the following manner, for example. Namely, in the route information to the destination, information on the route and latitude for each predetermined distance (or for each place where a moving direction is changed etc.) is included. Also, in the memory 306, there is stored information of a range that can be covered by the region represented by the route and the latitude. The control unit 304 reads out from the memory 306 the range of the region in which the route and the location for each predetermined distance exist, so that can acquire the location information included in the planned travel range.

The control unit 304 outputs the acquired location information (in this case, location information at present or location information indicative of a passing region) to the baseband processing unit 309. The purpose for transmitting such location information is to access the database 110 to download idle channel information from the database 110, for example. Meanwhile, the control unit 304 can also transmit to the slave apparatus 300-2 the idle channel information downloaded from the database 110, for example. In order to either transmit the location information to the server apparatus 100 or transmit the downloaded idle channel information to the slave apparatus 300-2, the control unit 304 outputs the location information, the idle channel information, etc. to the baseband processing unit 309, for example.

According to an instruction from the control unit 304, the GPS processing unit 305 communicates with a satellite through the antenna 301, to acquire the location of the self-apparatus, so as to output the acquired information to the control unit 304 as location information. Also, according to an instruction to search for a route to the destination, the GPS processing unit 305 searches for a route, acquires the route to the destination, and outputs the acquired route information to the control unit 304, as the route information to the destination.

The GPS processing unit 305 functions as a car navigation processing unit and retains map information etc., so that can search for the route to the destination according to the instruction from the control unit 304, for example. Here, in regard to the route to the destination instructed from the control unit 304, the route is input from an operator operating the master apparatus 300-1, and then, the control unit 304 outputs to the GPS processing unit 305 an instruction corresponding to the input, so as to be input to the GPS processing unit 305, for example.

In the memory 306, idle channel information is stored. The idle channel information includes, for example, an effective period. For example, when the master apparatus 300-1 and the slave apparatus 300-2 are expected to move in a certain region within a certain period (one day, for example), the certain period of concern comes to the effective period. Accordingly, the idle channel information stored in the memory 306 is effective as idle channel information within the effective period, whereas becomes unusable after the lapse of the effective period. For this purpose, the control unit 304 activates the timer 308, so that can delete the idle channel information from the memory 306 after the lapse of the effective period. When the effective period elapses, the master apparatus 300-1 accesses the database 110 to download idle channel information from the database 110, so as to newly retain the idle channel information in the memory 306, for example. When the effective period elapses, the slave apparatus 300-2 also receives a broadcast packet from the master apparatus 300-1 to extract the idle channel information of the region of concern, so as to newly retain in the memory 306.

Also, in regard to the idle channel information, there is an effective range, for example. When the master apparatus 300-1 is expected to move in a certain region within a certain period, the range of the planned moving region comes to the effective range. For example, in the example of FIG. 7, the idle channel information of the region 1 (600-1) is effective for the master apparatus 300-A in the region 1 (600-1), whereas ineffective in another region. Also, the idle channel information of the region 4 (600-4) is effective for the master apparatus 300-A in the region 4 (600-4), whereas ineffective in another region. The same is also applicable for the slave apparatus 300-2, not only for the master apparatus 300-1.

As described earlier, such idle channel information can be downloaded by the master apparatus 300-1 from the database 110 through the base station 200. In addition thereto, downloading through the Internet is also possible, for example.

The external IF 307 comes to an interface when such downloading through the Internet is performed.

Figure 6:
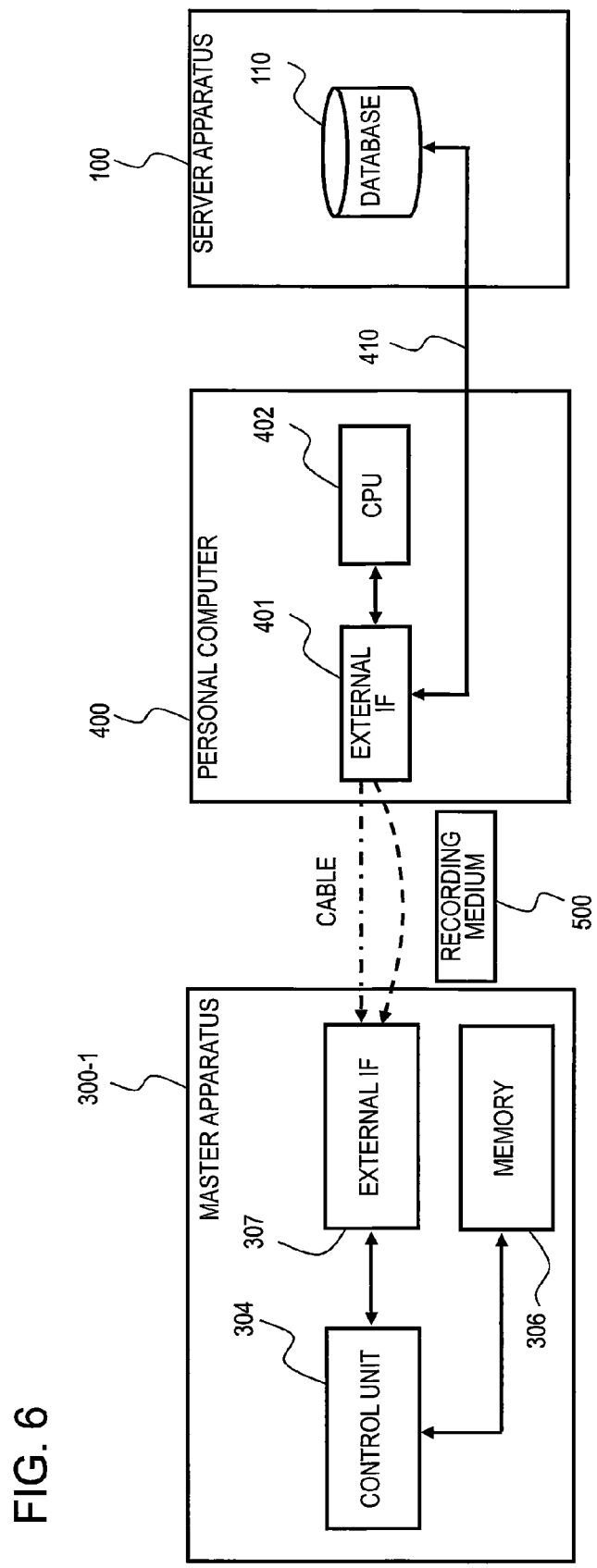
FIG. 6 is a diagram illustrating a configuration example of each apparatus when downloading idle channel information through the Internet.

Now, a description will be given about downloading the idle channel information through the Internet. FIG. 6 is a diagram illustrating the configuration example of each apparatus when downloading through the Internet. It is assumed that a personal computer 400 is installed at home etc., for example, and connected to the database 110 through the Internet 410.

The personal computer 400 includes a CPU 402 and an external IF 401. The CPU 402 controls the external IF 401 to access the database 110 through the Internet, so as to download idle channel information from the database 110. In this case, location information (location information indicative of the present location of the master apparatus 300-1 or location information related to the region through which the master apparatus 300-1 passes) is input to the CPU 402 by the input of an operator of the personal computer 400. The CPU 402 transmits the location information to the server apparatus 100, to thereby enable downloading from the database 110 the idle channel information corresponding to the location information.

The external IF 401 is connected to the external IF 307 of the master apparatus 300-1 through a cable, so as to output to the external IF 307 the idle channel information downloaded by the CPU 402, by an instruction from the CPU 402, the control unit 304, or the like.

Alternatively, on the external IF 401, a portable recording medium 500 can be mounted, for example, so that the idle channel information downloaded from the database 110 can be stored into the recording medium 500 by the control of the CPU 402. The recording medium 500 can also be mounted on the external IF 307 of the master apparatus 300-1, so that the idle channel information can be read out from the recording medium 500 mounted on the external IF 307 and stored into the memory 306 by the control unit 304 of the master apparatus 300-1.

As such, the master apparatus 300-1 can download the idle channel information through the base station 200 (FIG. 2, for example), and also can download the idle channel information through the Internet 410 using the personal computer 400.

Referring back to FIG. 5, the timer 308 counts time by an instruction of the control unit 304, for example, to output a count value to the control unit 304. The control unit 304 compares the count value with a set effective time, for example, to thereby enable the discrimination of the effective period of an idle channel.

The baseband processing unit 309 performs error correction coding processing, modulation processing, etc. on the idle channel information, the location information, etc. output from the control unit 304. To enable such processing, the baseband processing unit 309 may internally include an error correction coding circuit, a modulator circuit, etc.

The radio processing unit 310 converts an output signal of the baseband processing unit 309 into a radio signal of the radio frequency band. To enable such frequency conversion processing, the radio processing unit 310 may internally include a frequency conversion circuit, a BPF, etc.

The radio signal is transmitted to the base station 200 and the slave apparatus 300-2 through the antenna 301. This causes the transmission of the location information to the base station 200 and the transmission of the idle channel information to the slave apparatus 300-2, for example.

Next, a configuration example of the slave apparatus 300-2 will be described. FIG. 5 is a diagram illustrating a configuration example of the slave apparatus 300-2.

Similar to the master apparatus 300-1, the slave apparatus 300-2 includes an antenna 301, radio processing units 302, 310, baseband processing units 303, 309, a control unit 304, a GPS processing unit 305, a memory 306, an external IF 307 and a timer 308.

Here, the antenna 301, the radio processing unit 302, the baseband processing unit 303 and the control unit 304 correspond to the receiving unit 353 in the first embodiment, for example.

The slave apparatus 300-2 receives (or copies) idle channel information from the master apparatus 300-1, to perform radio communication with the other slave apparatus 300-3 and the master apparatus 300-1, using the received idle channel information, for example.

Therefore, it may also be possible for the slave apparatus 300-2 neither to acquire location information from the GPS processing unit 305 to transmit to the server apparatus 100, nor to acquire idle channel information through the external IF 307. In this case, it may also be possible for the slave apparatus 300-2 to include neither the GPS processing unit 305 nor the external IF 307.

Both the master apparatus 300-1 and the slave apparatus 300-2 can perform radio communication with the other slave apparatus 300-3 or the master apparatus 300-1 in the region, using the idle channel information stored in the memory 306. For example, the control unit 304 of each apparatus 300-1, 300-2 controls each radio processing unit 302, 310 to transmit or receive a radio signal using a frequency corresponding to the idle channel information, to thereby enable radio communication using the idle channel information.

<Operation Example>

Next, an operation example according to the present second embodiment will be described.

In regard to the present operation example, the description will be given first on respective operation examples when the master apparatus 300-1 and the slave apparatus 300-2 move along certain moving routes, and subsequently, on each operation example of the master apparatus 300-1 and the slave apparatus 300-2 using a flowchart.

FIG. 7 is a diagram illustrating each moving route of master apparatuses 300-A to 300-C and a slave apparatus 300-a. First, a description will be given on the operation example using FIG. 7.

In FIG. 7, the master apparatus 300-1 is represented as the master apparatuses 300-A to 300-C, and the slave apparatus 300-2 is represented as the slave apparatus 300-a.

It is assumed that, as depicted with the dotted line, the slave apparatus 300-a is expected to move from a region 1 (600-1) through a region 2 (600-2) and a region 3 (600-3) to a region 4 (600-4). For example, as described earlier, it is assumed that, by means of the GPS processing unit 305 of the slave apparatus 300-a, the moving route as depicted in FIG. 7 is expected as route information to a destination.

On the other hand, as depicted in FIG. 7, it is assumed that the master apparatus 300-A is expected to move in regions including the region 1 (600-1) and the region 4 (600-4) in the same one day. In this case also, it is assumed that such a route is expected by the GPS processing unit 305 of the master apparatus 300-A, as route information to a destination, for example.

In this case, the master apparatus 300-A, when located in the region 1 (600-1), downloads from the database 110 the idle channel information of each region including the region 1 (600-1) and the region 4 (600-4).

In regard to an acquisition method by downloading, the master apparatus 300-A may acquire through the base station 200 as depicted in FIG. 2, or may acquire through the Internet 410 as depicted in FIG. 6.

Further, it is assumed that the master apparatus 300-B is expected to move on a route depicted in FIG. 7, through the region 2 (600-2), the region 3 (600-3), etc. in the same day.

It is also assumed that, before reaching the region 2 (600-2), the master apparatus 300-B completes downloading the idle channel information of the region 2 (600-2) and the idle channel information of the region 3 (600-3) from the database 110, for example.

Further, it is assumed that the master apparatus 300-C is expected to move on a route depicted in FIG. 7 through the region 2 (600-2) etc. in the same day.

Also, it is assumed that, before reaching the region 2 (600-2), the master apparatus 300-C also completes downloading the idle channel information of the region 2 (600-2) from the database 110, for example.

In such a situation, it is assumed that originally the slave apparatus 300-a does not store any idle channel information when located in the region 1 (600-1).

Further, it is assumed that the slave apparatus 300-a can encounter the master apparatus 300-A in the region 1 (600-1). In this case, the slave apparatus 300-a acquires (or copies) from the master apparatus 300-A the idle channel information of both the region 1 (600-1) and the region 4 (600-4) which are regions in which the moving region of the self-apparatus overlaps with the moving region of the master apparatus 300-A.

Next, it is assumed that, after moving to the region 2 (600-2), the slave apparatus 300-a can encounter the master apparatus 300-B in the region 2 (600-2). In this case, the slave apparatus 300-a acquires from the master apparatus 300-B the idle channel information of both the region 2 (600-2) and the region 3 (600-3) which are regions overlapped with the moving region of the master apparatus 300-B.

By this, the slave apparatus 300-a can acquire the idle channel information of the moving region 1 (600-1) to the region 4 (600-4).

For example, when the slave apparatus 300-a encounters the master apparatus 300-C in the region 2 (600-2) without encountering the master apparatus 300-B, the slave apparatus 300-a can acquire the idle channel information of the overlapped region 2 (600-2) from the master apparatus 300-C.

In the above-mentioned example, the slave apparatus 300-a acquires the idle channel information from the master apparatuses 300-A to 300-C. However, in addition thereto, the slave apparatus 300-a can also acquire idle channel information from each slave apparatus having the stored idle channel information of each region 1-4 (600-1 to 600-4). For example, in the region 1 (600-1), the slave apparatus 300-a can also acquire the idle channel information of the region 1 (600-1) from another slave apparatus having the stored idle channel information of the region 1 (600-1). Also, in the region 2 (600-2), the slave apparatus 300-a can acquire the idle channel information of the region 2 (600-2) from another slave apparatus having the stored idle channel information of the region 2 (600-2).

In the idle channel information acquired by the slave apparatus 300-a, an effective period and an effective range are set, as described earlier. For example, the example depicted in FIG. 7 illustrates an example in which a route is set in one day. The period of the above one day can be one example of a time during which the idle channel information is effective. When the slave apparatus 300-a moves in the above period, the idle channel information becomes ineffective after the lapse of one day after the movement. Also, in regard to the effective range, the idle channel information of each region is effective within the range of each region in which the slave apparatus 300-a moves from the region 1 (600-1) to the region 4 (600-4).

Figure 8:
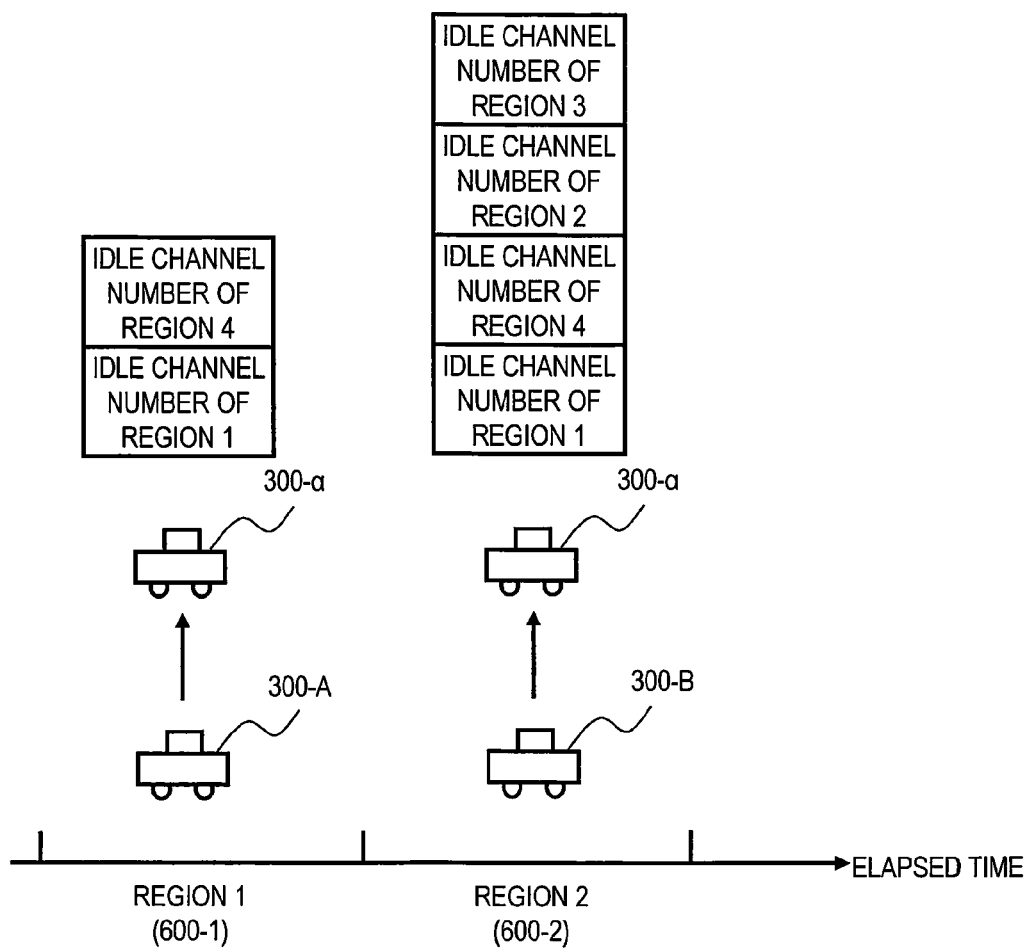
FIG. 8 is a diagram illustrating an example of a slave apparatus acquiring idle channel information.

FIG. 8 is a diagram illustrating how the slave apparatus 300-a acquires the idle channel information in each region. The example depicted in FIG. 8 illustrates an example in which an idle channel number is used as idle channel information.

As depicted in FIG. 8, in the region 1 (600-1), the slave apparatus 300-a acquires the idle channel information of both the region 1 (600-1) and the region 4 (600-4) from the master apparatus 300-A. Also, in the region 2 (600-2), the slave apparatus 300-a acquires the idle channel information of both the region 2 (600-2) and the region 3 (600-3). In the above example, there is illustrated an example in which, in the region 2 (600-2), the slave apparatus 300-a acquires the idle channel numbers of all moving regions.

Figure 9A:
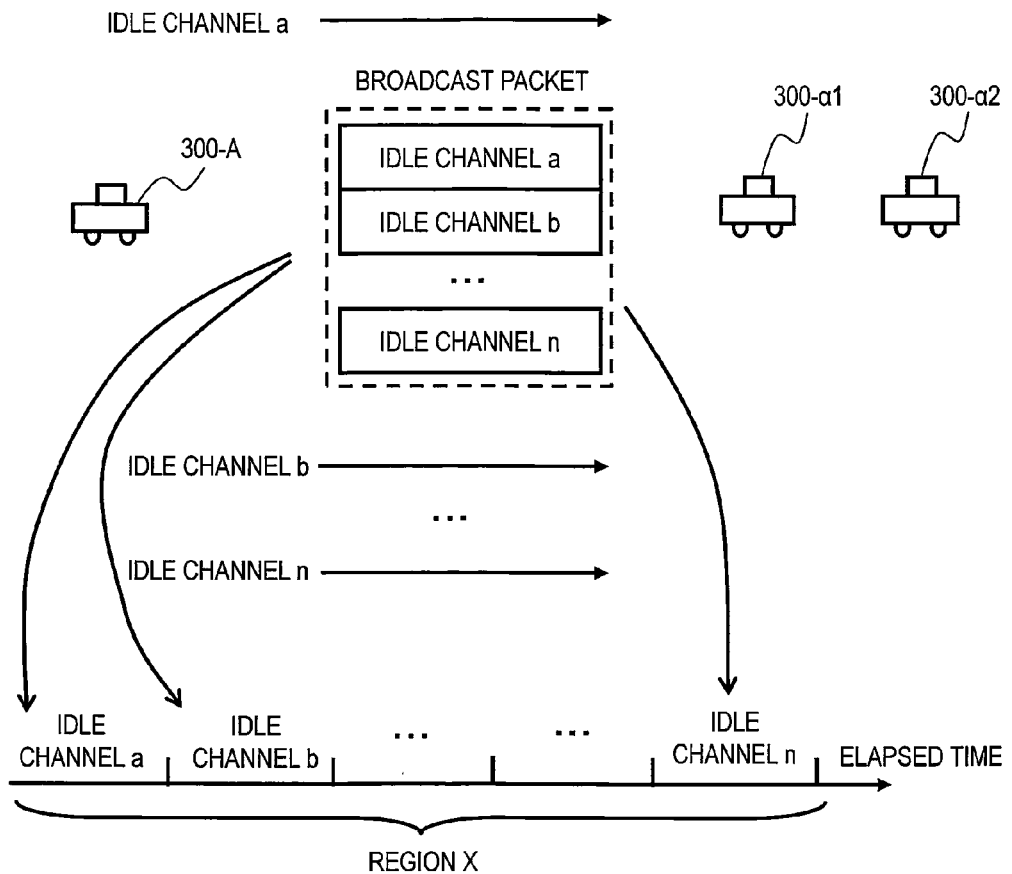
FIG. 9A is a diagram illustrating an example of a master apparatus transmitting a broadcast packet.

Next, a description on how the master apparatus 300-A transmits the idle channel information will be given below. FIG. 9A is a diagram illustrating an example when the master apparatus 300-A periodically transmits the idle channel information in a region X.

For example, the master apparatus 300-A broadcast transmits the idle channel information in the form of a broadcast packet. In this case, the master apparatus 300-A transmits a broadcast packet at certain timing using an idle channel "a", and transmits a broadcast packet at the next timing using an idle channel "b". As such, in the region X, the master apparatus 300-A broadcast transmits the idle channel information successively using each idle channel, at the frequency of the idle channel of concern.

In the region X, the slave apparatus 300-a1 can receive a broadcast packet at the idle channel frequency. For example, there is determined a rule such that the master apparatus 300-A transmits each broadcast packet within a predetermined frequency range. The slave apparatus 300-a1 searches the frequency range of concern, so that can receive the broadcast packet transmitted using an idle channel.

In the example depicted in FIG. 9A, there is illustrated an example in which a plurality of idle channels exist in the region X. However, the number of idle channel information may be one, for example. In this case, the master apparatus 300-A comes to transmit the broadcast packet using the idle channel of concern.

The broadcast packet depicted in FIG. 9A illustrates an example of idle channel information in the region X, for example. However, the idle channel information of another region may be included in the broadcast packet.

Figure 9B:
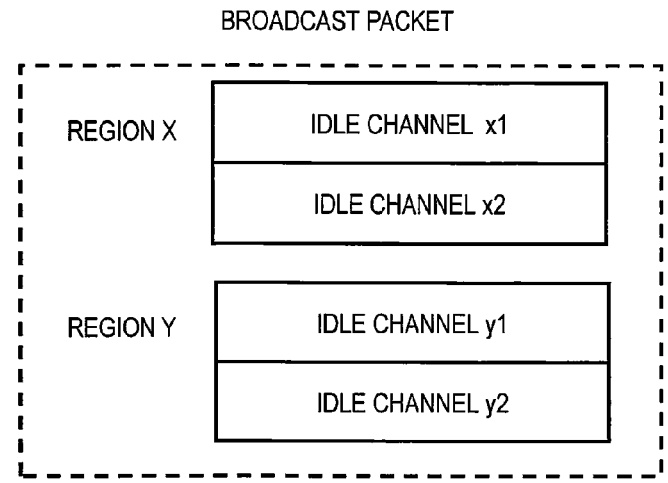
FIG. 9B is an example of a broadcast packet, respectively.

FIG. 9B illustrates an example in which the idle channel information of a plurality of regions is included in the broadcast packet. For example, in the region X, the idle channel information of each region, namely, the region X and a region Y may also be broadcast transmitted from the master apparatus 300-1. As depicted in FIG. 9B, along with the idle channel information, information related to a region may be included in the broadcast packet.

Figure 10:
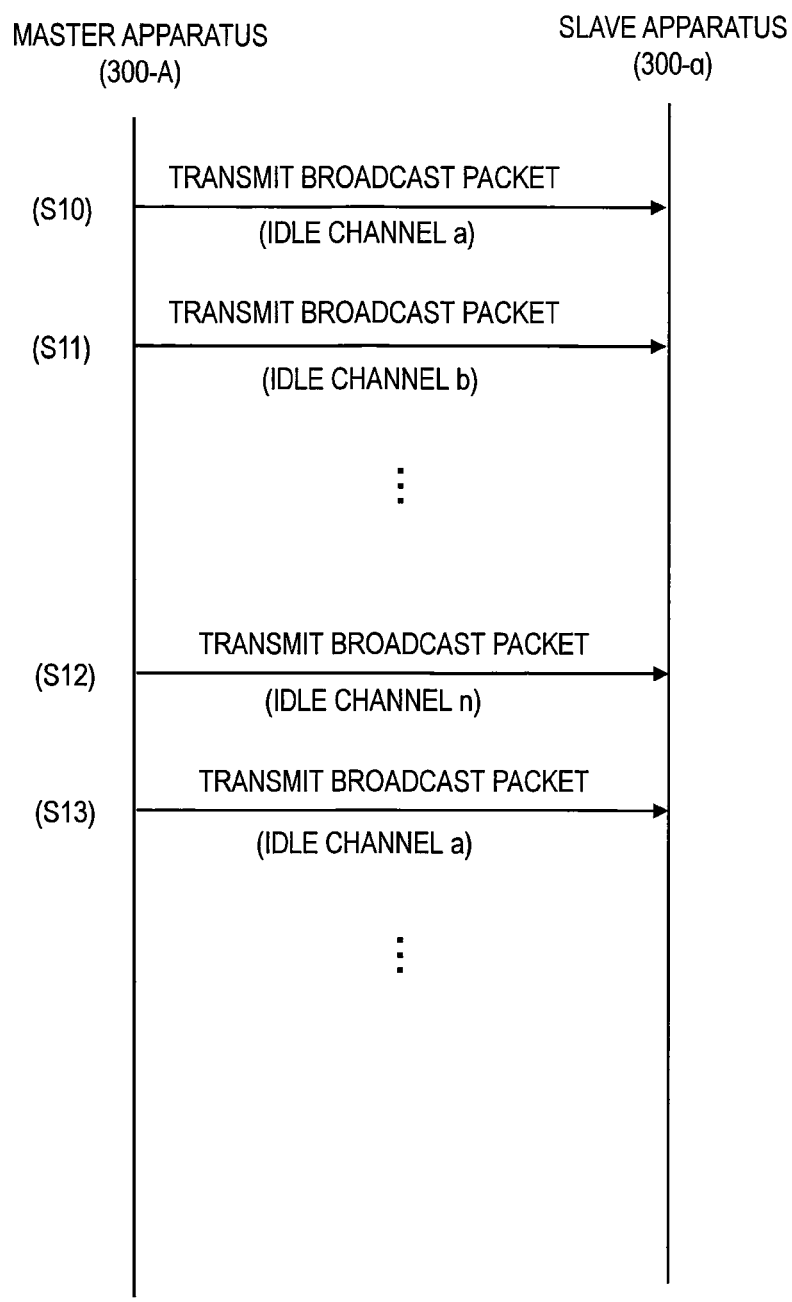
FIG. 10 is a sequence diagram illustrating an operation example of transmitting a broadcast packet.

FIG. 10 illustrates a sequence example when the master apparatus 300-A transmits idle channel information. The master apparatus 300-A periodically transmits broadcast packets successively using each idle channel (S10-S12). On completion of transmitting broadcast packets using every idle channel, the master apparatus 300-A transmits a broadcast packet using an idle channel frequency that is used for the first transmission (S13). By the repetition thereof, the master apparatus 300-A transmits broadcast packets including idle channel information.

Figure 11:
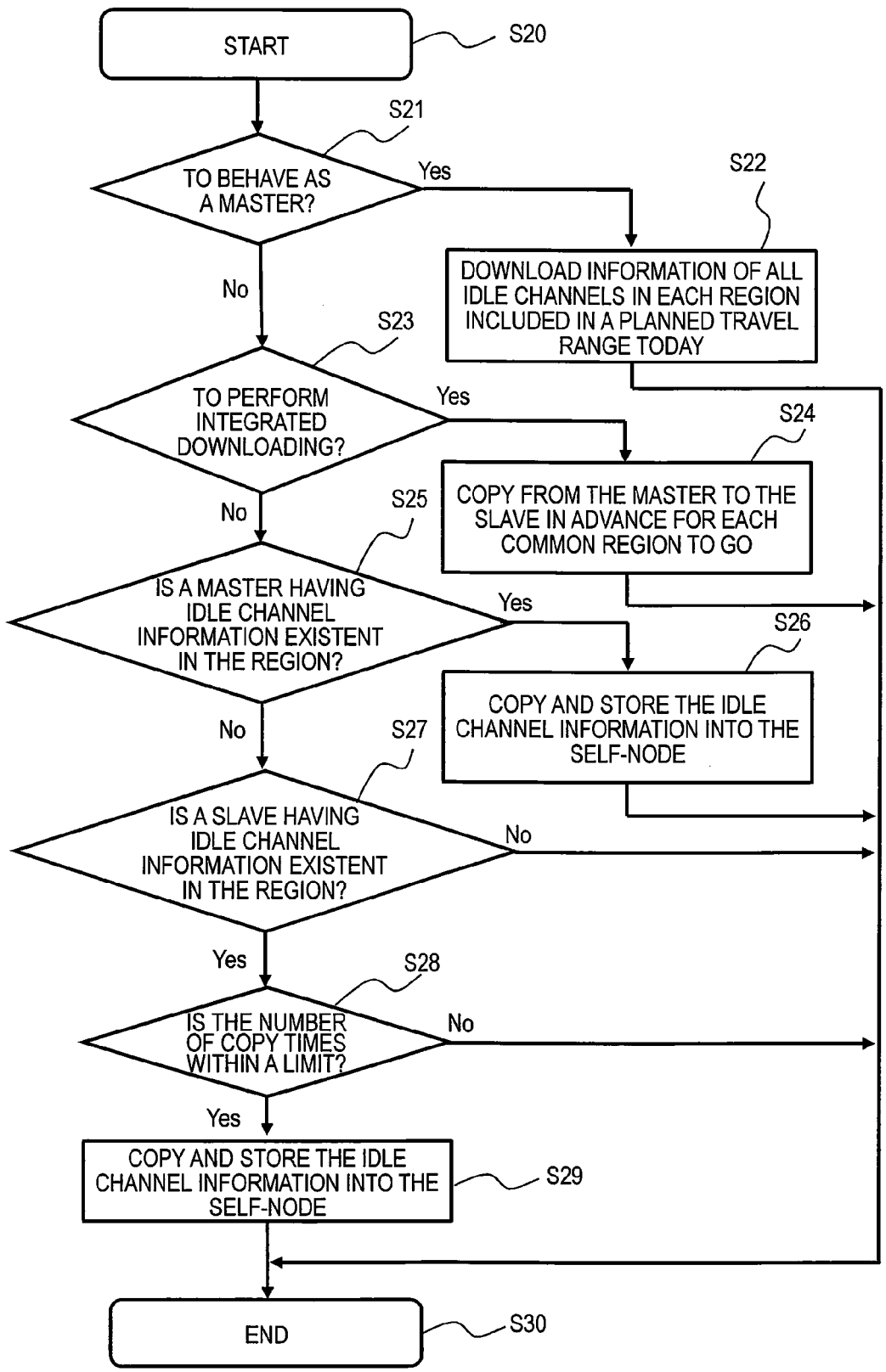
FIG. 11 is a flowchart illustrating operation examples of a master apparatus and a slave apparatus.

Next, a description will be given on each operation example of the master apparatus 300-1 and the slave apparatus 300-2 using a flowchart. FIG. 11 is a flowchart illustrating the operation example of the master apparatus 300-1 and the slave apparatus 300-2. The aforementioned operation example is summarized and a description on duplicated contents is appropriately omitted.

In the operation example depicted in FIG. 11, for example, each radio communication apparatus 300-1 to 300-3 starts processing from a state whether to operate as a master apparatus or a slave apparatus is not determined yet.

The radio communication apparatus 300-1 to 300-3, on starting processing (S20), determines whether or not to behave (operate) as a master apparatus (S21).

For example, when an operator operating the radio communication apparatus 300-1 inputs a setting to the radio communication apparatus 300-1 to operate as a master apparatus, the radio communication apparatus 300-1 can operate as master apparatus 300-1. Alternatively, because the radio communication apparatus 300-1 does not download idle channel information from the database 110 yet in the present processing stage, when the operator inputs an instruction to download, the radio communication apparatus 300-1 can determine to operate as master apparatus 300-1. The radio communication apparatus 300-1 can decide the present processing according to the presence or absence of such an input, for example.

When the radio communication apparatus 300-1 determines to behave as master apparatus 300-1 (Yes in S21), the master apparatus 300-1 downloads information of all idle channels in each region included in the planned travel range of the day (S22).

For example, according to an instruction of the control unit 304, the GPS processing unit 305 (FIG. 5, for example) in the master apparatus 300-1 searches for a route to a destination, to acquire route information to the destination. The control unit 304 receives the route information to the destination and reads out, from information stored in the memory 306, the range of regions in which the route of concern exists. This enables the control unit 304 to acquire location information related to each region included in the planned travel range of the master apparatus 300-1. Then, the control unit 304 transmits the acquired location information to the server apparatus 100, so that can download the idle channel information of the region of concern from the database 110. In the example depicted in FIG. 7, the master apparatus 300-A downloads from the database 110 the idle channel information of each region, included in the planned travel range, including the region 1 (600-1) and the region 4 (600-4).

Referring back to FIG. 11, the master apparatus 300-1, after downloading idle channel information from the database 110 (S22), completes a series of processing (S30).

On the other hand, when not behaving as master apparatus (No in S21), each radio communication apparatus 300-1 to 300-3 comes to behave as slave apparatus, so as to discriminate in this case whether or not to perform integrated downloading (S23).

For example, in regard to the radio communication apparatus 300-2, when it is determined not to behave as master apparatus, it is determined to operate as slave apparatus 300-2.

In this case, the slave apparatus 300-2 can discriminate whether or not to perform integrated downloading dependent on whether or not idle channel information of a plurality of regions can be extracted from the received broadcast packet, for example.

For example, the slave apparatus 300-2 compares information related to each region, which is included in the broadcast packet received from the master apparatus 300-1, with information related to each region included in the planned travel range of the self-apparatus acquired from the GPS processing unit 305. In regard to the above two regions, if there are a plurality of common (or duplicated) regions, the slave apparatus 300-2 can determine to perform integrated downloading (Yes in S23). On the other hand, if there is one common region or no common region, the slave apparatus 300-2 can determine not to perform integrated downloading (No in S23). The above discrimination is performed by the control unit 304 of the slave apparatus 300-2, for example.

Referring back to FIG. 11, when the slave apparatus 300-2 performs integrated downloading (Yes in S23), the slave apparatus 300-2 copies the idle channel information of the common regions from the master apparatus 300-1 (S24).

For example, the slave apparatus 300-2 extracts from the broadcast packet the idle channel information of the plurality of common regions between each region included in the received broadcast packet and each region included in the planned travel range of the self-apparatus. In the example depicted in FIG. 7, the slave apparatus 300-*a* extracts the idle channel information of the region 1 (600-1) and the region 4 (600-4) from the received broadcast packet, so as to perform integrated downloading.

In the example depicted in FIG. 7, the slave apparatus 300-*a*, when moving to the region 2 (600-2), can perform integrated downloading of the idle channel information of the region 2 (600-2) and the region 3 (600-3), which are common regions to the master apparatus 300-B in a planned travel route, from the master apparatus 300-B.

Referring back to FIG. 11, when performing integrated downloading of the idle channel information of the common regions (S24), the slave apparatus 300-2 completes a series of processing (S30).

On the other hand, when not performing integrated downloading (No in S23), the slave apparatus 300-2 discriminates whether or not a master apparatus 300-1 that includes the idle channel information is existent in the region of concern (S25). When not performing integrated downloading, the slave apparatus 300-2 in a region of moving in comes to copy the idle channel information of the region of concern from the master apparatus 300-1.

In the present processing (S25), whether or not the master apparatus 300-1 including idle channel information is existent can be discriminated in the following manner, for example.

Namely, the slave apparatus 300-2 located in a certain region receives a broadcast packet being broadcast transmitted from the master apparatus 300-1 (FIG. 9A, for example). By means of the GPS processing unit 305, the slave apparatus 300-2 can grasp the region in which the self-apparatus is located. If information included in the broadcast packet and related to a region which is coincident with a region where the self-apparatus is currently located is included in the broadcast packet, the slave apparatus 300-2 can copy the idle channel information of the region of concern. Accordingly, it is possible to discriminate whether or not the master apparatus 300-1 that includes the idle channel information is existent dependent on whether or not the information included in the broadcast packet and related to the region which is coincident with the region where the self-apparatus is currently located is included in the broadcast packet. Such discrimination is performed by the control unit 304 of the slave apparatus 300-2, for example.

The slave apparatus 300-2 copies the idle channel information from the master apparatus 300-1 if the master apparatus 300-1 that includes idle channel information is existent in the region of concern (Yes in S25), to store into the slave apparatus 300-2 (S26). The slave apparatus 300-a then completes a series of processing (S30).

On the other hand, if the master apparatus 300-1 that includes idle channel information is not existent in the region of concern (No in S25), the slave apparatus 300-2 discriminates whether or not another slave apparatus that includes idle channel information is existent in the region of concern (S27).

For example, when integrated downloading is not performed (No in S23), and when no master apparatus 300-1 is existent in the region of concern (No in S25), the slave apparatus 300-2 is configured to discriminate whether or not a slave apparatus including idle channel information is existent in the region of concern.

It is possible to discriminate in the following manner whether or not another slave apparatus including idle channel information is existent in the region of concern, for example.

Namely, as described in FIG. 8, the slave apparatus 300-a successively stores idle channel information in each region, so as to store the idle channel information included in the planned travel route during traveling on the planned travel route. Such a slave apparatus, similar to the master apparatus 300-1, can also broadcast transmit the idle channel information in the region of concern.

Therefore, the slave apparatus 300-2 can discriminate whether or not another slave apparatus including idle channel information is existent, dependent on whether or not the slave apparatus 300-2 can receive the idle channel information of the region of concern transmitted from the other slave apparatus.

Referring back to FIG. 11, when another slave apparatus including idle channel information is existent (Yes in S27), the slave apparatus 300-2 discriminates whether or not the number of times of copy is within a limit (S28).

The reason for the provision of such limitation in the number of times of copy is that a case when an access to the database 110 is managed based on charging, like a certain amount of money per access, is taken into consideration, for example. In regard to the copy of the idle channel information from one slave apparatus to another slave apparatus, it is also intended to prevent a charge system from becoming virtually ineffective due to the spread of copying without making an access to the database 110.

For example, the slave apparatus 300-2, when storing the idle channel information into the memory 306, increments a count value, and if the count value reaches a limited number of times, the slave apparatus 300-2 can be prevented from reading out the idle channel information stored in the memory 306. Such processing can be performed by the control unit 304 of the slave apparatus 300-2, for example.

The slave apparatus 300-2, when the number of times of copy is within the limit (Yes in S28), copies the idle channel information of the region of concern, to store into the memory 306 (S29).

For example, the slave apparatus 300-2 receives a broadcast packet from another slave apparatus that includes the idle channel information of the region of concern. Then, when the extraction of the idle channel information from the broadcast packet is within the limited number of times of copy, the slave apparatus 300-2 stores the idle channel information into the memory 306.

Then, the slave apparatus 300-2 (or the master apparatus 300-1) completes a series of processing (S30).

On the other hand, when no other slave apparatus including idle channel information is existent in the region of concern (No in S27), the slave apparatus 300-2 completes a series of processing (S30). In this case, the slave apparatus 300-2 fails to encounter another slave apparatus that retains idle channel information in a certain region, so as not to be able to receive idle channel information. In such a case, because of not including the idle channel information of the region of concern, the slave apparatus 300-2 is unable to perform vehicle-to-vehicle communication with another slave apparatus 300-3 and the master apparatus 300-1 in the region of concern.

Further, when the idle channel information copied from another slave apparatus exceeds the limited number of times of copy (No in S28), the slave apparatus 300-2 discards the idle channel information extracted from the broadcast packet, without storing into the memory 306, and completes a series of processing (S30).

As having been described on the present second embodiment, the master apparatus 300-1 downloads idle channel information from the database 110, to broadcast transmit the downloaded idle channel information. The slave apparatus 300-2 receives the idle channel information from the master apparatus 300-1, by which an opportunity of the slave apparatus 300-2 to access the database 110 disappears. Thus, an access frequency of the master apparatus 300-1 to the database 110 can be suppressed to a constant or lower by comparison with an access frequency when both the master apparatus 300-1 and the slave apparatus 300-2 access the database 110. The suppression of the access frequency to the constant or lower enables the suppression of an amount of communication traffic (or a communication amount) between the radio communication apparatuses 300-1 to 300-3 and the base station 200 to a constant or lower.

Third Embodiment

Next, a third embodiment will be described. In the second embodiment, the description is given on the example in which the master apparatus 300-1 accesses the database 110 to download idle channel information, and the slave apparatus 300-2 copies idle channel information in an integrated manner from the master apparatus 300-1.

In the present third embodiment, there is given an example in which no distinction between a master apparatus and a slave apparatus is made. In this example, each radio communication apparatus 300-1 to 300-3 acquires idle channel information in the region of concern when capable of acquiring from another radio communication apparatus, whereas downloads idle channel information from the database 110 when incapable of acquisition, for example.

Figure 12:
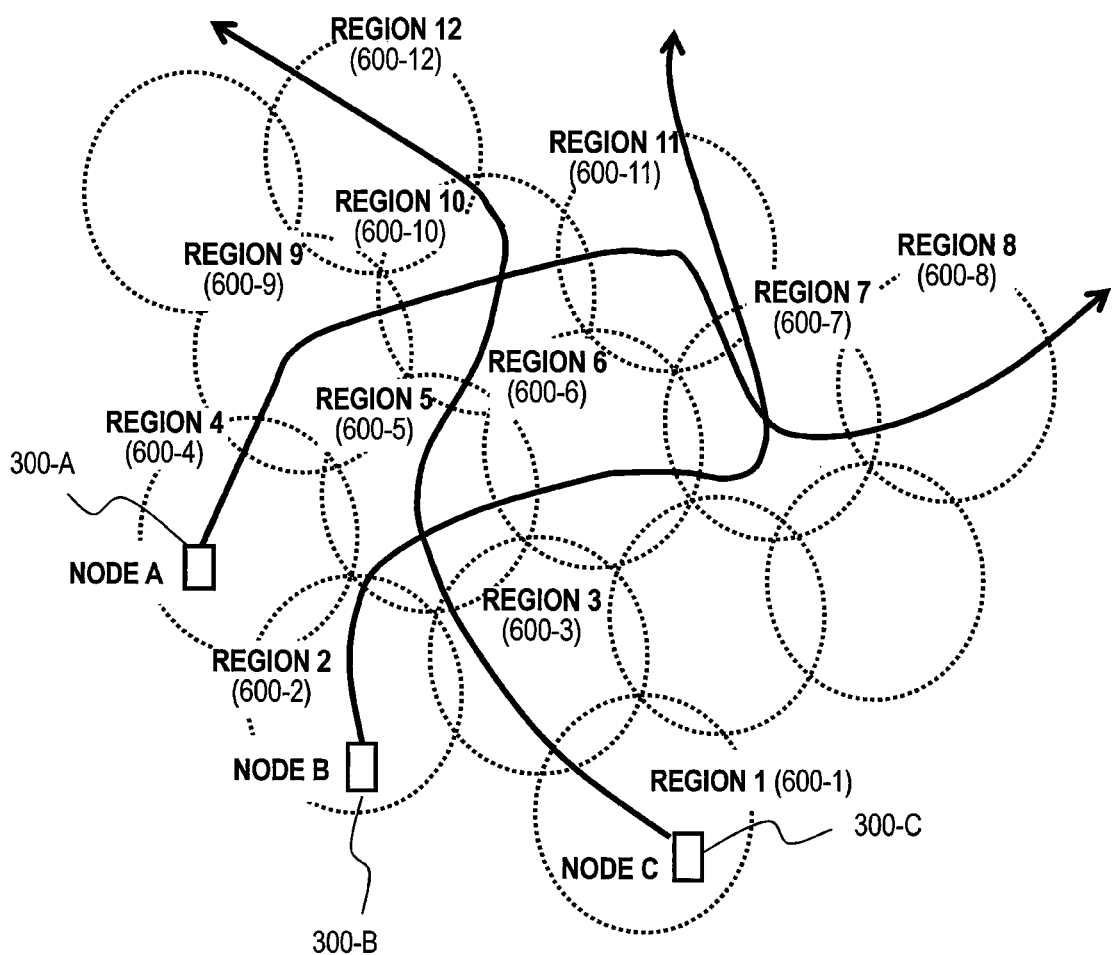
FIG. 12 is a diagram illustrating an example of each moving route of a master apparatus and a slave apparatus.

A detailed description will be given in the following. FIG. 12 is a diagram illustrating each example of planned moving routes of the radio communication apparatuses 300-A to 300-C. In FIG. 12, the radio communication apparatuses 300-A to 300-C are represented by nodes 300-A to 300-C. In the following, the radio communication apparatuses 300-A to 300-C may be referred to as nodes 300-A to 300-C.

It is assumed that, as depicted in FIG. 12, the node A (300-A) is expected to move in one certain day from a region 4 (600-4) to a region 8 (600-8), through a region 9 (600-9), a region 10 (600-10), a region 11 (600-11) and a region 7 (600-7). For example, similar to the second embodiment, it is assumed that a route to the destination is searched for by the GPS processing unit 305 of the node A, and by the control unit 304, the route can be expected from each passing region.

Also, it is also assumed that, in the same one day, the node B (300-B) is expected to move from a region 2 (600-2) to the region 11 (600-11) through a region 5 (600-5) etc. Further, it is also assumed that, in the same one day, the node C (300-C) is expected to move from a region 1 (600-1) to a region 12 (600-12) through a region 3 (600-3) etc.

Figure 13:
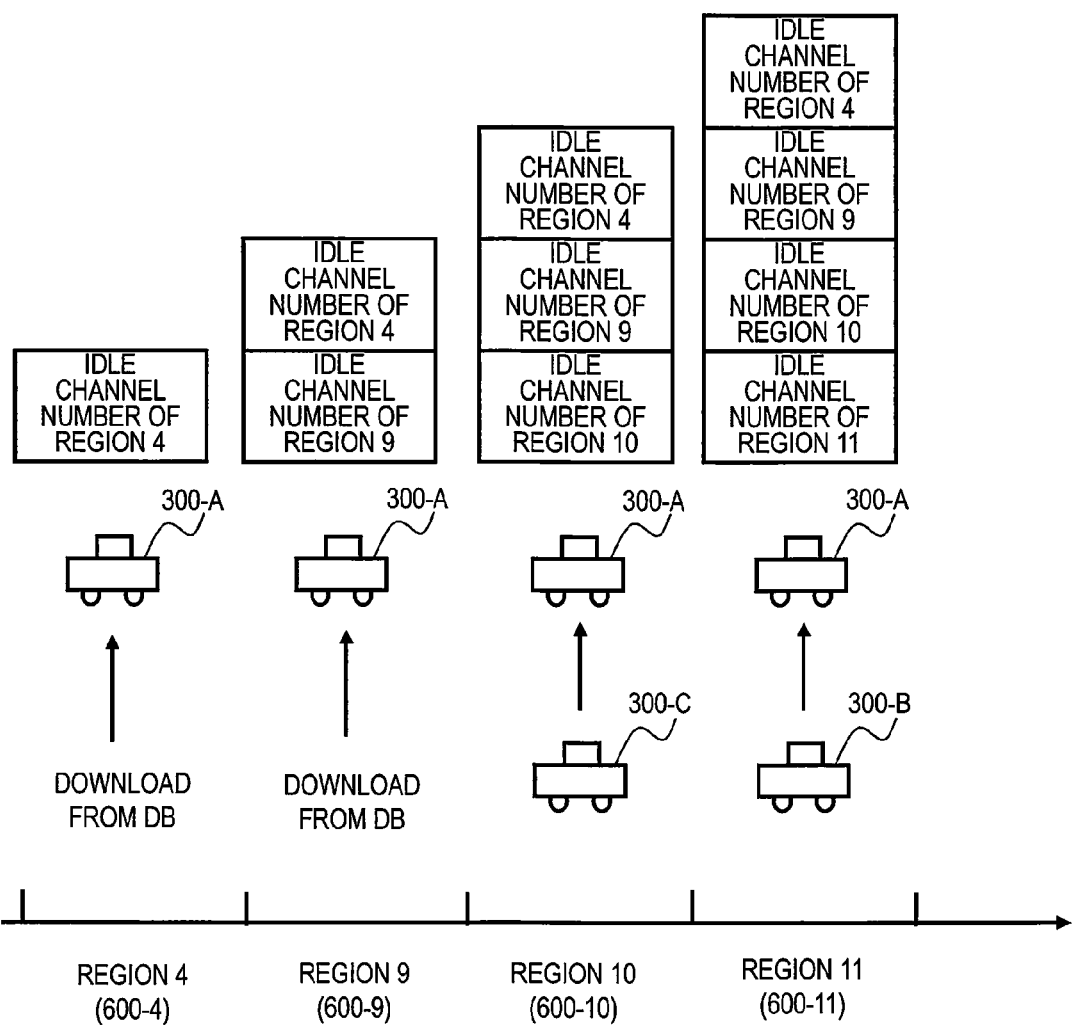
FIG. 13 is a diagram illustrating an example of a slave apparatus acquiring idle channel information.

FIG. 13 is a diagram illustrating an example how the node A (300-A) acquires idle channel information when moving on the route depicted in FIG. 12.

It is assumed that the node A (300-A) does not retain any idle channel information originally when locating in the region 4 (600-4).

Because the node A (300-A) does not encounter any other node that includes the idle channel information of the region 4 (600-4) (or such another node is not existent) in the region 4 (600-4), the node A (300-A) downloads the idle channel information of the region 4 (600-4) from the database 110 through the base station 200.

Next, when the node A (300-A) moves to the region 9 (600-9), because the node A (300-A) does not encounter another node that includes the idle channel information of the region 9 (600-9), the node A (300-A) downloads the idle channel information of the region 9 (600-9) from the database 110 through the base station 200.

Next, it is assumed that, when the node A (300-A) moves to the region 10 (600-10), the node A (300-A) can encounter the node C (300-C). In this case, the node A (300-A) copies the idle channel information of the region 10 (600-10) from the node C (300-C) that retains the idle channel information of the region 10 (600-10).

Next, it is assumed that, when the node A (300-A) moves to the region 11 (600-11), the node A (300-A) can encounter the node B (300-*b*) that retains the idle channel information of the region 11 (600-11). In this case, the node A (300-A) copies the idle channel information of the region 11 (600-11) from the node B (300-*b*) that retains the idle channel information of the region 11 (600-11).

In each region, the node A (300-A) receives the idle channel information of the region of concern if receivable from another node, whereas if not receivable, comes to download the idle channel information of the region of concern from the database 110.

As depicted in FIG. 13, if the travel distance of the node A (300-A) comes to a constant or larger, the passing region thereof also becomes a constant or larger, and a storage amount of the idle channel information of each region also comes to a constant or larger. In such a case, the node A (300-A) transmits the stored idle channel information to another node, to thereby enable the other node to acquire the idle channel information of a common region to the node A (300-A).

Figure 14:
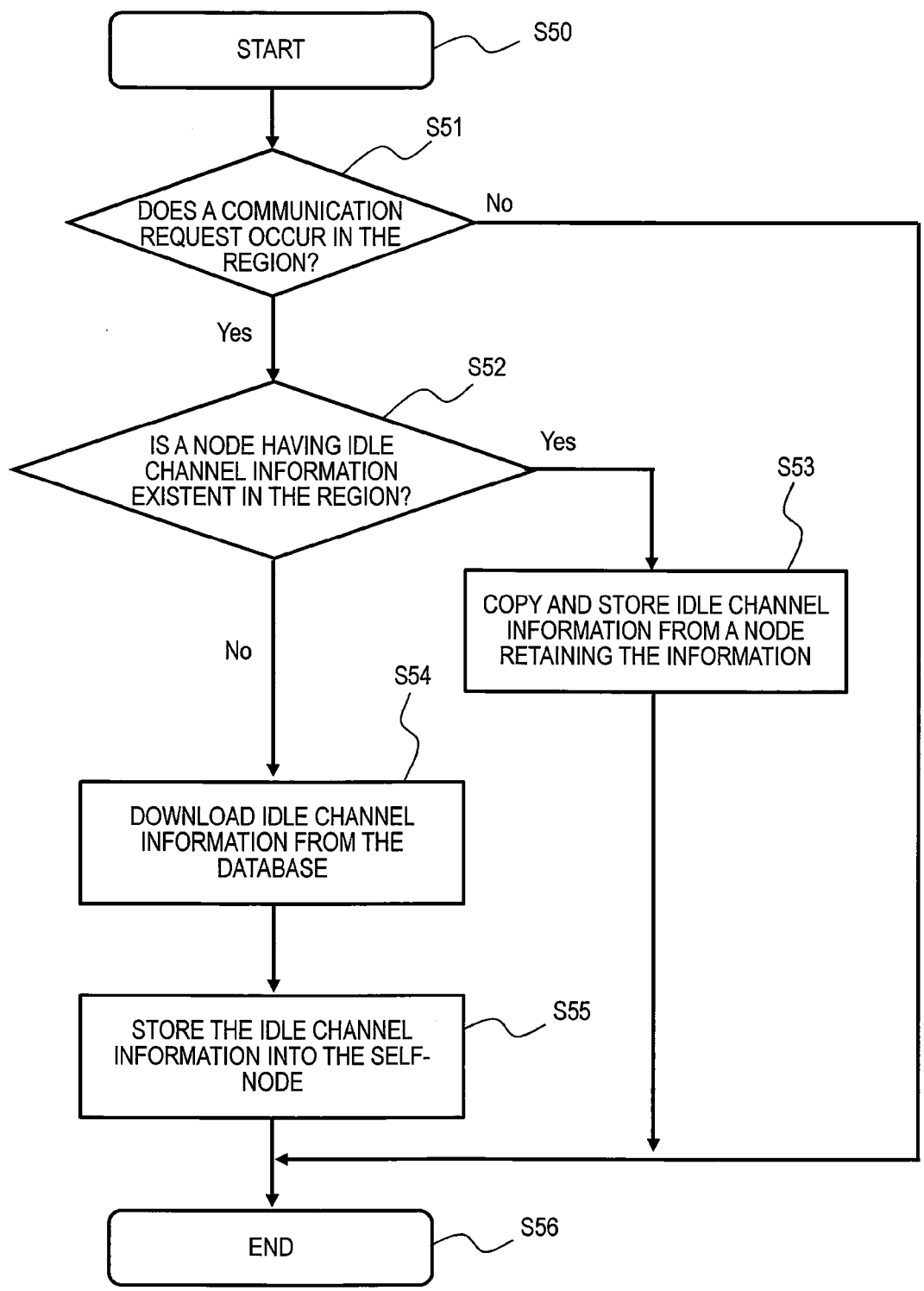
FIG. 14 is a flowchart illustrating an operation example of a radio communication apparatus.

FIG. 14 is a flowchart illustrating an operation example according to the present third embodiment. The flowchart depicted in FIG. 14 is summarized from the above-mentioned operation example, and the description of a part duplicated with the operation example depicted in FIGS. 12 and 13 will appropriately be omitted.

The node A (300-A), on starting processing (S50), discriminates whether or not a communication request occurs in the region of concern (51).

For example, when the node A (300-A), which does not retain the idle channel information of the region of concern in the memory 306, generates (or transmits) a communication request for vehicle-to-vehicle communication, it is possible to discriminate to be Yes in S51, whereas when otherwise, discriminate to be No in S51. For example, the control unit 304 of the node A (300-A) can discriminate the processing of S51 dependent on whether or not there is an operation input from an operator to instruct the communication request for vehicle-to-vehicle communication.

The node A (300-A), on the occurrence of the communication request in the region of concern (Yes in S51), discriminates whether or not a node that includes idle channel information is existent in the region of concern (S52).

The processing of S52 can be discriminated in the following manner, for example. Namely, the node A (300-A) performs frequency search in the region of concern, to confirm whether or not a broadcast packet including idle channel information is notified. Similar to the second embodiment, another node that retains idle channel information performs broadcast transmission of a broadcast packet including idle channel information, using an idle channel (for example, FIG. 9A). By searching within a predetermined range of frequencies, the node A (300-A) can receive the broadcast packet transmitted by use of the idle channel within the range of concern.

When confirming that another node including idle channel information is existent in the region of concern (Yes in S52), the node A (300-A) copies the idle channel information from the other node that retains the idle channel information, to store into the memory 306 (S53).

In the example depicted in FIG. 12, on confirming that the node C (300-C) is existent in the region 10 (600-10), the node A (300-A) receives the idle channel information of the region 10 (600-10) from the node C (300-C).

Referring back to FIG. 14, the node A (300-A), after retaining the idle channel information of the region of concern in the memory 306 (S53), completes a series of processing (S56).

On the other hand, on confirming that no other node that retains idle channel information is existent in the region of concern (No in S52), the node A (300-A) downloads idle channel information from the database 110 (S54), and stores the idle channel information into the memory 306 (S55).

Then, the node A (300-A) completes a series of processing (S56).

In the example depicted in FIG. 12, the node A (300-A) in the region 4 (600-4) fails to receive the broadcast-transmitted idle channel information in the frequency search (No in S52), and therefore, the node A (300-A) downloads the idle channel information of the region 4 from the database 110 (S5).

According to the present third embodiment, in a certain region, if there is another radio communication apparatus that retains the idle channel information of the region of concern, the radio communication apparatus 300 copies the idle channel information from the other radio communication apparatus. On the other hand, if there is no such other radio communication apparatus, the radio communication apparatus 300 downloads the idle channel information of the region of concern from the database 110.

Accordingly, in comparison with a case when all radio communication apparatuses 300 download idle channel information from the database 110, the present radio communication apparatus can suppress an access frequency to the database 110 to a constant or lower, because there is a case of copying idle channel information from another radio communication apparatus. Because the access frequency comes to the constant or lower, an amount of communication traffic (or a communication amount) between the radio communication apparatus 300 and the base station 200 can be suppressed to a constant or lower.

Further, if the radio communication apparatus 300 does not originally store idle channel information, the information amount of the idle channel information comes to a constant or larger as the radio communication apparatus 300 passes through a plurality of regions, causing a case of the occurrence of a state in which the idle channel information can be transmitted to another radio communication apparatus. In such a case, the other radio communication apparatus can receive from the radio communication apparatus 300 the idle channel information of the region of a moving destination, to come to be able to acquire idle channel information without an access to the database 110. Therefore, in such a case, an access frequency from the other radio communication apparatus to the database 110 can be suppressed to a constant or lower, so that an amount of communication traffic (or a communication amount) between the other radio communication apparatus and the base station 200 can be suppressed to a constant or lower.

Other Embodiments

Next, other embodiments will be described.

Figure 15:
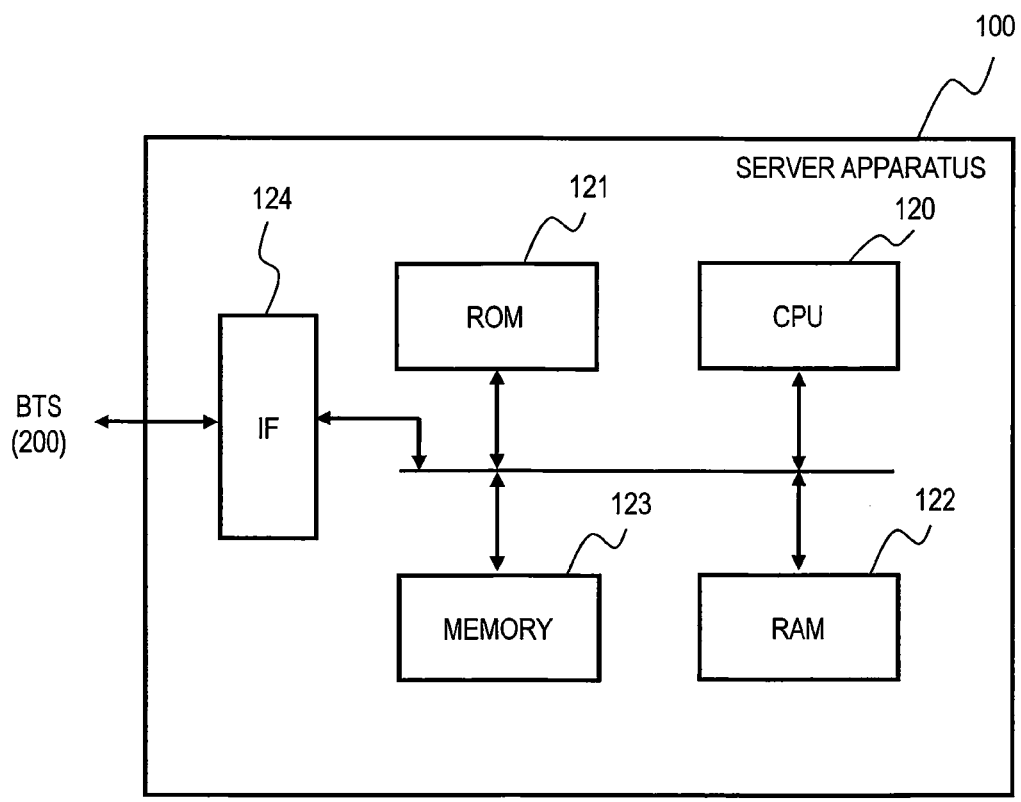
FIG. 15 is a diagram illustrating a configuration example of a server apparatus.
Figure 16:
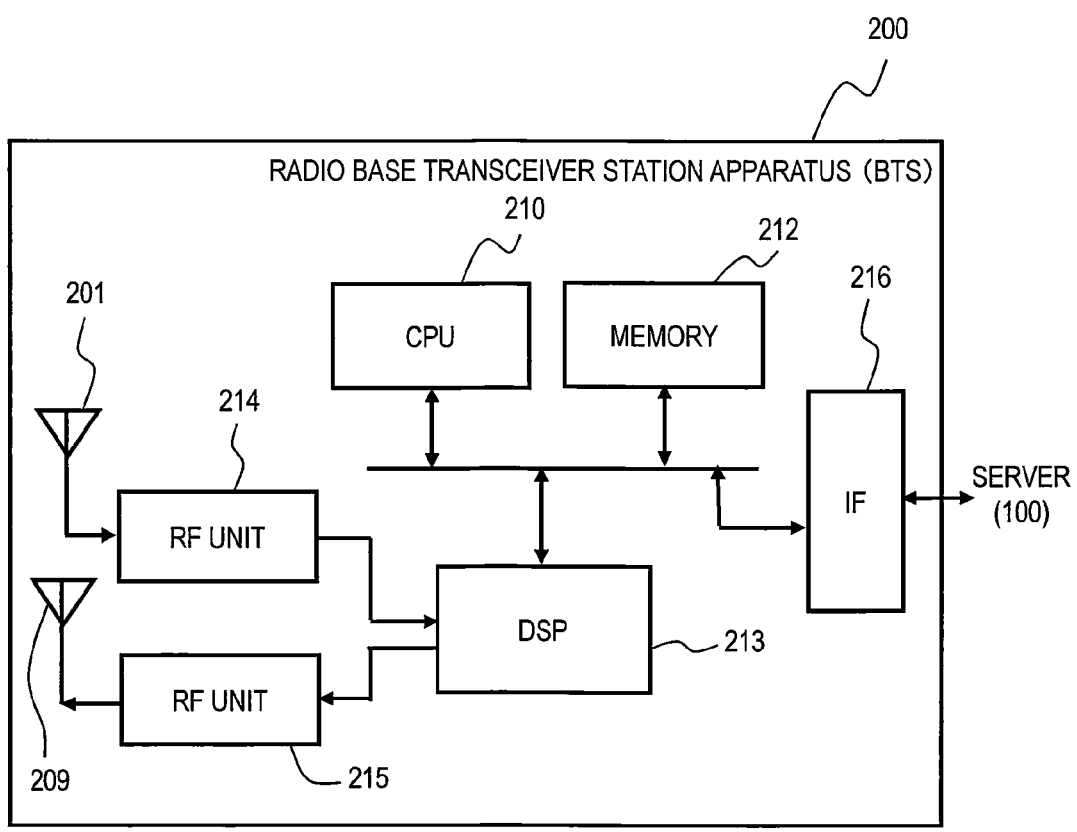
FIG. 16 is a diagram illustrating a configuration example of a radio base station apparatus.
Figure 17:
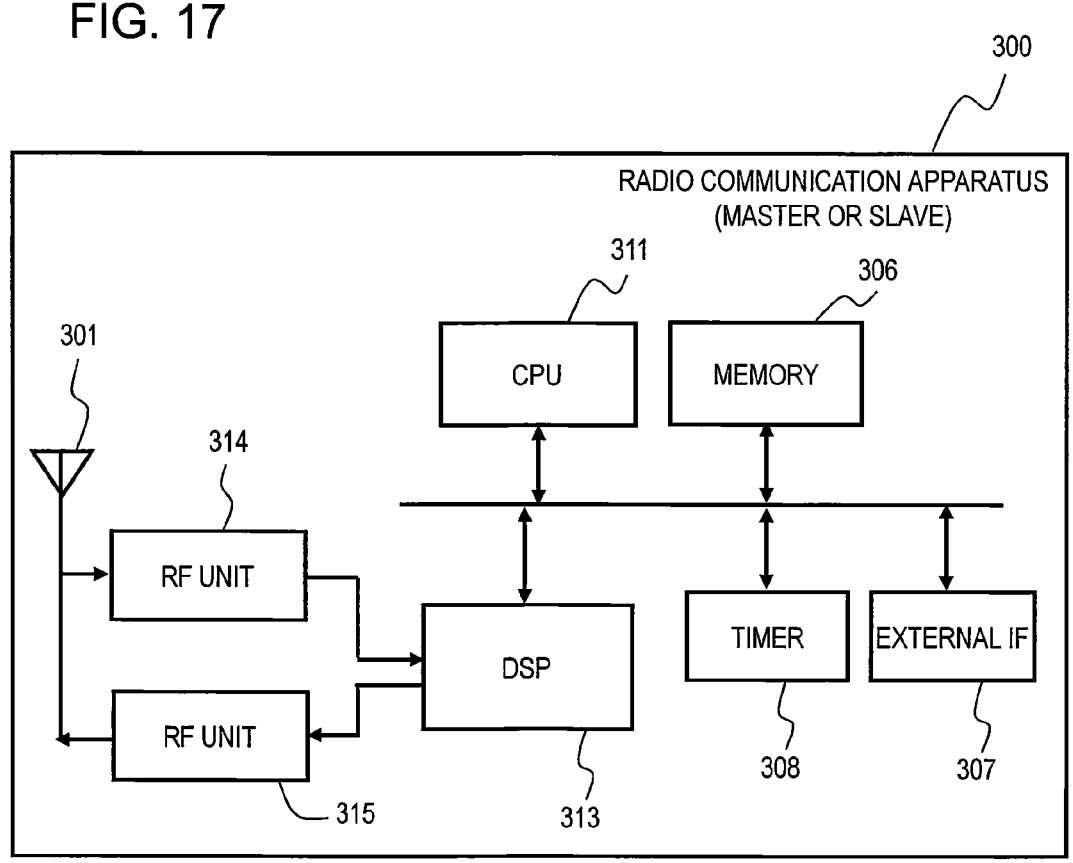
FIG. 17 is a diagram illustrating a configuration example of a radio communication apparatus.

FIG. 15, FIG. 16 and FIG. 17 are diagrams illustrating other configuration examples of a server apparatus 100, a base station 200 and a radio communication apparatus 300, respectively.

The server apparatus 100 further includes a CPU (Central Processing Unit) 120, a ROM (Read Only Memory) 121, a RAM (Random Access Memory) 122, a memory 123 and an IF (Interface) 124.

The CPU 120 corresponds to the control unit 102 (for example, FIG. 3) in the second embodiment, for example. Also, the memory 123 corresponds to the database 110 in the second embodiment, for example. Further, the IF 124 corresponds to the transmission/reception processing unit 101 in the second embodiment, for example.

For example, the CPU 120 reads out a program stored in the ROM 121 to load on the RAM 122, and by executing the loaded program, can actualize the function of the control unit 102 as described in the second embodiment. For example, the database 110 is stored in the memory 123, and idle channel information read out from the memory 123 is transmitted through the IF 124 to the base station 200.

The base station 200 further includes a CPU 210, a memory 212, a DSP (Digital Signal Processor) 213 and RF (Radio Frequency) units 214, 215, and an IF 216.

The CPU 210 corresponds to the control unit 205 in the second embodiment, for example. Also, the DSP 213 corresponds to baseband processing units 203, 207 in the second embodiment, for example. Further, the RF unit 214 corresponds to the radio processing unit 202 in the in the second embodiment, for example. Also, the RF unit 215 corresponds to the radio processing unit 208 in the second embodiment, for example. Further, the IF 216 corresponds to the server-side transmission/reception processing unit 206 in the second embodiment, for example.

For example, the CPU 210 outputs a control signal to the DSP 213, to cause the DSP unit 213 to operate. By this, the DSP unit 213 actualizes the functions of the baseband processing units 203, 207 as described in the second embodiment, for example, and with the operation of the RF units 214, 215, can perform radio communication with the radio communication apparatus 300.

The radio communication system 300 further includes a CPU 311, a DSP 313 and RF units 314, 315.

The CPU 311 corresponds to a control unit 304 in the second embodiment, for example. Also, the DSP 313 corresponds to the baseband processing units 303, 309 in the second embodiment, for example. Further, the RF unit 314 corresponds to the radio processing unit 302 in the second embodiment, and the RF unit 315 corresponds to the radio processing unit 310 in the second embodiment, respectively, for example. In addition, the GPS processing unit 305 in the second embodiment corresponds to the CPU 311 or the DSP 313, for example.

For example, the CPU 311 outputs a control signal to the DSP 313, to thereby enable the DSP 313 to operate. By this, the DSP 313 can actualize each function of the baseband processing units 303, 309 and the GPS processing unit 305, as described in the second embodiment, for example, and with the operation of the RF units 314, 315, can perform radio communication with the base station 200.

It is possible to provide a radio communication system, a radio communication apparatus, and a radio communication method for the radio communication system, configured to suppress an amount of communication traffic.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A radio communication system comprising:
a storage apparatus configured to store frequency information relating to a frequency band usable for radio communication;
a first radio communication apparatus configured to acquire the frequency information from the storage apparatus; and
a second radio communication apparatus configured to perform radio communication with the first radio communication apparatus, wherein:
the first radio communication apparatus includes a transmission unit which transmits to the second radio communication apparatus the frequency information acquired from the storage apparatus and relating to a frequency band usable for radio communication in a region to which the first radio communication apparatus moves, and
the second radio communication apparatus includes a receiving unit which receives the frequency information from the first radio communication apparatus.

2. The radio communication system according to claim 1, wherein the second radio communication apparatus is further configured to include a control unit configured to extract from the received frequency information frequency information in a common region of the region to which the first radio communication apparatus moves and a region to which the second radio communication apparatus moves.

3. The radio communication system according to claim 2, wherein the control unit extracts from the received frequency information a plurality of frequency information corresponding to a plurality of common regions respectively, when the plurality of common regions exist.

4. The radio communication system according to claim 1, wherein the receiving unit receives from the first radio communication apparatus in a first and second regions first and second frequency information usable for radio communication in the first and second regions to which the second radio communication apparatus moves, respectively.

5. The radio communication system according to claim 1, wherein the receiving unit receives the frequency information from a third radio communication apparatus in a region to which the second radio communication apparatus moves, when the third radio communication apparatus storing the frequency information received from the first radio communication apparatus and usable for radio communication in the region to which the second radio communication apparatus moves exists.

6. The radio communication system according to claim 1, wherein the receiving unit stores the received frequency information in a memory of the second radio communication apparatus in a case within a limit number of copies, and does not store the received frequency information in the memory of the second radio communication apparatus in a case of excess of the limit number of copies.

7. The radio communication system according to claim 1, wherein the first radio communication apparatus acquires the frequency information from the storage apparatus when a fourth radio communication apparatus storing the frequency information relating to the frequency band usable for radio communication in the region to which the first radio communication apparatus moves does not exist in the region, and receives the frequency information from the fourth radio communication apparatus when the fourth radio communication apparatus exists in the region.

8. The radio communication system according to claim 1, wherein the receiving unit receives the frequency information from the storage apparatus when the first radio communication apparatus does not exist in a region in which the second radio communication apparatus locates, and receives the frequency information from the first radio communication apparatus when the first radio communication apparatus exists in the region in which the second radio communication apparatus locates.

9. The radio communication system according to claim 1, wherein the frequency information is information relating to a frequency band not being used for terrestrial digital television broadcast and being usable for radio communication, out of a frequency band allocated for terrestrial digital television broadcast.

10. The radio communication system according to claim 1, wherein the transmission unit transmits the frequency information to the second radio communication apparatus by using the frequency band being usable for radio communication.

11. A radio communication apparatus for performing radio communication with another radio communication apparatus, the radio communication apparatus comprising:
a receiving unit configured to receive frequency information relating to a frequency band being usable by the radio communication apparatus stored in a storage apparatus; and
a transmission unit configured to transmit to the other radio communication apparatus the frequency information received from the storage apparatus and relating to a frequency band usable for radio communication in a region to which the radio communication apparatus moves.

12. A radio communication method in a radio communication system including a storage apparatus storing frequency information relating to a frequency band usable for radio communication, a first radio communication apparatus acquiring the frequency information from the storage apparatus, and a second radio communication apparatus performing radio communication with the first radio communication apparatus, the method comprising:
transmitting to the second radio communication apparatus the frequency information acquired from the storage apparatus and relating to a frequency band usable for radio communication in a region to which the first radio communication apparatus moves, by the first radio communication apparatus; and
receiving the frequency information from the first radio communication apparatus, by the second radio communication apparatus.

13. A radio communication system comprising:
a first radio communication apparatus; and
a second radio communication apparatus configured to perform radio communication with the first radio communication apparatus, wherein:
the first radio communication apparatus includes a transmission unit configured to transmit to the second radio communication apparatus frequency information relating to a frequency band usable for radio communication in a region to which the first radio communication apparatus moves, and
the second radio communication apparatus is further configured to include a receiving unit which receives the frequency information transmitted from the first radio communication apparatus.

\* \* \* \* \*